US012531350B2

(12) United States Patent
Lee et al.

(10) Patent No.: US 12,531,350 B2
(45) Date of Patent: Jan. 20, 2026

(54) ANTENNA AND ELECTRONIC DEVICE INCLUDING THE SAME

(71) Applicant: SAMSUNG ELECTRONICS CO., LTD., Suwon-si (KR)

(72) Inventors: Jongmin Lee, Suwon-si (KR); Seungtae Ko, Suwon-si (KR); Yoongeon Kim, Suwon-si (KR); Sanghoon Park, Suwon-si (KR); Jungmin Park, Suwon-si (KR); Bumhee Lee, Suwon-si (KR); Seokmin Lee, Suwon-si (KR); Seungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 18/078,356

(22) Filed: Dec. 9, 2022

(65) Prior Publication Data

US 2023/0187844 A1 Jun. 15, 2023

Related U.S. Application Data

(63) Continuation of application No. PCT/KR2022/018715, filed on Nov. 24, 2022.

(30) Foreign Application Priority Data

Dec. 14, 2021 (KR) ........................ 10-2021-0178919
Jan. 13, 2022 (KR) ........................ 10-2022-0005354

(51) Int. Cl.
*H01Q 21/06* (2006.01)
*H01Q 25/00* (2006.01)

(52) U.S. Cl.
CPC ......... *H01Q 21/065* (2013.01); *H01Q 25/001* (2013.01)

(58) Field of Classification Search
CPC ...... H01Q 21/065; H01Q 25/001; H01Q 1/24; H01Q 9/04; H01Q 9/0414; H01Q 21/24; H01Q 21/08; H01Q 1/246; H04B 7/0413
See application file for complete search history.

(56) References Cited

U.S. PATENT DOCUMENTS 6,424,298 B1 7/2002 Nishikawa et al.
9,385,430 B2 7/2016 Kushta et al.
10,135,133 B2 11/2018 Wu et al.
(Continued)

FOREIGN PATENT DOCUMENTS

CN 1822438 8/2006
CN 101599579 12/2009
(Continued)

OTHER PUBLICATIONS

Valeria Tapia, Rafael RodrÃ-guez, NicolÃ¡s Reyes, F. Patricio Mena, Pavel Yagoubov, Francesco Cuttaia, and Leonardo Bronfman, "Systematic study of the cross polarization introduced by broadband antireflection layers at microwave frequencies," Appl. Opt. 57, 9223-9229 (Year: 2018).*
(Continued)

*Primary Examiner* — Hai V Tran
*Assistant Examiner* — Austin M Back
(74) *Attorney, Agent, or Firm* — Nixon & Vanderhye P.C.

(57) ABSTRACT

The present disclosure relates to a 5th generation (5G) or pre-5G communication system for supporting a higher data transmission rate after a 4th generation (4G) communication system such as long-term evolution (LTE). An antenna in a wireless communication system may include: a plurality of antenna elements including a first antenna element and a second antenna element, the first antenna element and the second antenna element may include patch antennas, the first antenna element and the second antenna element may
(Continued)

be disposed at a narrower interval than a reference interval, and the patch antenna may have an asymmetry structure.

12 Claims, 13 Drawing Sheets

(56) References Cited

U.S. PATENT DOCUMENTS

| | | | | |
|---|---|---|---|---|
| 2013/0027259 | A1 | 1/2013 | Fujita et al. | |
| 2020/0106182 | A1* | 4/2020 | Ravishankar .......... | H01Q 1/523 |
| 2020/0220270 | A1 | 7/2020 | Onaka et al. | |
| 2020/0303833 | A1 | 9/2020 | Ueda | |
| 2021/0151860 | A1* | 5/2021 | Park ........................ | H01Q 21/24 |
| 2021/0344120 | A1 | 11/2021 | Baek et al. | |

FOREIGN PATENT DOCUMENTS

| | | | |
|---|---|---|---|
| CN | 110854527 | | 2/2020 |
| CN | 111585006 | * | 8/2020 |
| CN | 112054303 | | 12/2020 |
| JP | 2001-111332 | | 4/2001 |
| JP | 2009-044522 | | 2/2009 |
| JP | 5718315 | | 5/2015 |
| KR | 10-2021-0011484 | | 2/2021 |
| KR | 2021001484 | * | 2/2021 |
| KR | 10-2021-0062574 | | 5/2021 |
| KR | 20210062574 | * | 5/2021 |

OTHER PUBLICATIONS

Craeye, C., and D. GonzÃ¡lez-Ovejero (2011), a review on array mutual coupling analysis, Radio Sci., 46, RS2012, doi:10.1029/2010RS004518 (Year: 2011).*

Search Report and Written Opinion dated Mar. 6, 2023 issued in International Patent Application No. PCT/KR2022/018715.

Extended European Search Report dated Dec. 20, 2024 for EP Application No. 22907753.2.

* cited by examiner

ANTENNA AND ELECTRONIC DEVICE INCLUDING THE SAME

CROSS-REFERENCE TO RELATED APPLICATIONS

This application is a continuation of International Application No. PCT/KR2022/018715 designating the United States, filed on Nov. 24, 2022, in the Korean Intellectual Property Receiving Office and claiming priority to Korean Patent Application No. 10-2021-0178919, filed on Dec. 14, 2021, in the Korean Intellectual Property Office, and to Korean Patent Application No. 10-2022-0005354, filed on Jan. 13, 2022, in the Korean Intellectual Property Office, the disclosures of all of which are incorporated by reference herein in their entireties.

BACKGROUND

Field

The disclosure relates to a wireless communication system, and for example, an antenna and an electronic device including the same in the wireless communication system.

Description of Related Art

To satisfy a wireless data traffic demand which is growing after a 4$^{th}$ generation (4G) communication system is commercialized, efforts are exerted to develop an advanced 5$^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency. To mitigate a path loss of propagation and to extend a propagation distance in a frequency range (FR) 1 bandwidth high frequency near 6 GHz and the extremely high frequency band over 6 GHz, the 5G communication system is discussing beamforming, massive multiple-input multiple-output (MIMO), full dimensional (FD)-MIMO, array antenna, analog beam-forming, and large scale antenna techniques.

For network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

The 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

In the 5G system, an electronic device includes a plurality of antenna elements. One or more antenna elements form a sub array. As the number of the antenna elements required for beamforming increases, the electronic device is required to design in a more effective structure in consideration of production cost and radiation performance of an antenna structure. In particular, the electronic device, which may require a specific interval between the antenna elements to increase the radiation performance of the antenna structure, is required to design in the more effective structure.

SUMMARY

Embodiments of the disclosure provide a structure of an antenna including asymmetry antenna elements and an electronic device including the same in a wireless communication system.

Embodiments of the disclosure provide a structure for improving radiation performance of an electronic device, using a structure including asymmetry antenna elements in a wireless communication system.

Embodiments of the disclosure provide a structure for mounting a great number of antenna elements, using a structure including asymmetry antenna elements in a wireless communication system.

According to an example embodiment of the present disclosure, an antenna of a wireless communication system may include a plurality of antenna elements including a first antenna element and a second antenna element. The first antenna element and the second antenna element may include patch antennas. The first antenna element and the second antenna element may be disposed at a narrower interval than a reference interval, and the patch antenna may be in an asymmetry structure.

According to an example embodiment of the present disclosure, a massive multiple input multiple output (MIMO) unit (MMU) device may include: a main board, a radio frequency integrated circuit (RFIC) disposed on the main board and a plurality of antenna elements disposed on the main board. The plurality of the antenna elements may include a first antenna element and a second antenna element. The first antenna element and the second antenna element may include patch antennas. The first antenna element and the second antenna element may be disposed at a narrower interval than a reference interval, and the patch antenna may be in an asymmetry structure.

An apparatus according to various example embodiments of the present disclosure may improve radiation performance of an electronic device, using a structure including asymmetry antenna elements in a wireless communication system.

An apparatus according to various example embodiments of the present disclosure may mount a great number of antenna elements, using a structure including asymmetry antenna elements in a wireless communication system.

Besides, effects obtainable from this disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Regarding the description of the drawings, the same or similar reference numerals may be used for the same or similar components.

DETAILED DESCRIPTION

Terms used in the present disclosure are used to describe various embodiments, and may not intend to limit the scope of the embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meaning as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach may be described as an example in various embodiments of the present disclosure to be described. However, various embodiments may include technology which uses both hardware and software, and accordingly various embodiments of the present disclosure do not exclude a software-based approach.

Terms indicating components (a module, a base substrate, a substrate, a printed circuit board (PCB), a board, a line, a transmission line, an antenna, an antenna array, a sub array, an antenna element, a feeding unit, a feeding point, a member, a material) and terms indicating configuration structures (a rectangle, a square, an opening portion) of a device used in the following explanation are illustrated for convenience of description. Accordingly, the present disclosure is not limited to the terms to be described, and other terms having the same or similar technical meanings may be used.

In addition, the present disclosure describes various embodiments using terms used in various communication standards (e.g., 3rd generation partnership project (3GPP)), which are merely examples used for explanation. Various embodiments of the present disclosure may be easily modified and applied in other communication system.

Figure 1A:
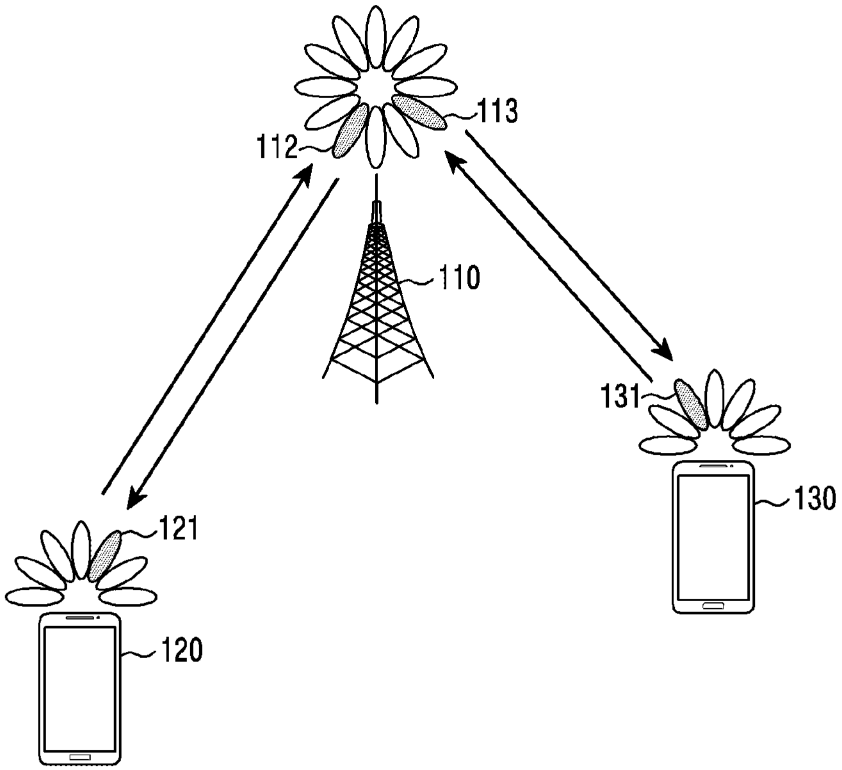
FIG. 1A is a diagram illustrating an example of a wireless communication environment according to various embodiments.

FIG. 1A is a diagram illustrating an example wireless communication system according to various embodiments. FIG. 1A illustrates a base station 110, a terminal 120, and a terminal 130, as some of nodes which use radio channels in the wireless communication system. Although FIG. 1A illustrates only one base station, another base station which is identical or similar to the base station 110 may be further included.

The base station 110 is a network infrastructure which provides radio access to the terminals 120 and 130. The base station 110 has coverage defined as a specific geographic region based on a signal transmission distance. The base station 110 may be referred to as, beside the base station, an 'access point (AP)', an 'eNodeB (eNB)', a '5th generation node (5G node)', a 'wireless point', a 'transmission/reception point (TRP)', or other term having technically identical meaning.

The terminal 120 and the terminal 130 each are a device is used by a user, and communicate with the base station 110 over a radio channel. In some cases, at least one of the terminal 120 and the terminal 130 may be operated without user's involvement. That is, at least one of the terminal 120 and the terminal 130 may be a device which performs machine type communication (MTC), and may not be carried by the user. The terminal 120 and the terminal 130 each may be referred to as, beside the terminal, a 'user equipment (UE)', a 'mobile station', a 'subscriber station', a 'customer premises equipment (CPE)', a 'remote terminal', a 'wireless terminal', an 'electronic device', or a 'user device', or other term having technically identical meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve a channel gain, the base station 110, the terminal 120, and the terminal 130 may perform beamforming. The beamforming may include transmit beamforming and receive beamforming. For example, the base station 110, the terminal 120, and the terminal 130 may give directivity to a transmit signal or a receive signal. For doing so, the base station 110 and the terminals 120 and 130 may select serving beams 112, 113, 121, and 131 through beam search or beam management. After the serving beams 112, 113, 121, and 131 are selected, communications may be performed through resources which are quasi co-located (QCL) with resources transmitting the serving beams 112, 113, 121, and 131.

The base station 110 or the terminals 120 and 130 may include an antenna array. Each antenna included in the antenna array may be referred to as an array element, or an antenna element. Hereafter, the antenna array is depicted as a two-dimensional planar array in the present disclosure, which is merely an example, and does not limit other embodiments of the present disclosure. The antenna array may be configured in various types such as a linear array or a multi-layer array. The antenna array may be referred to as a massive antenna array. In addition, the antenna array may include a plurality of sub arrays including a plurality of antenna elements.

Figure 1B:
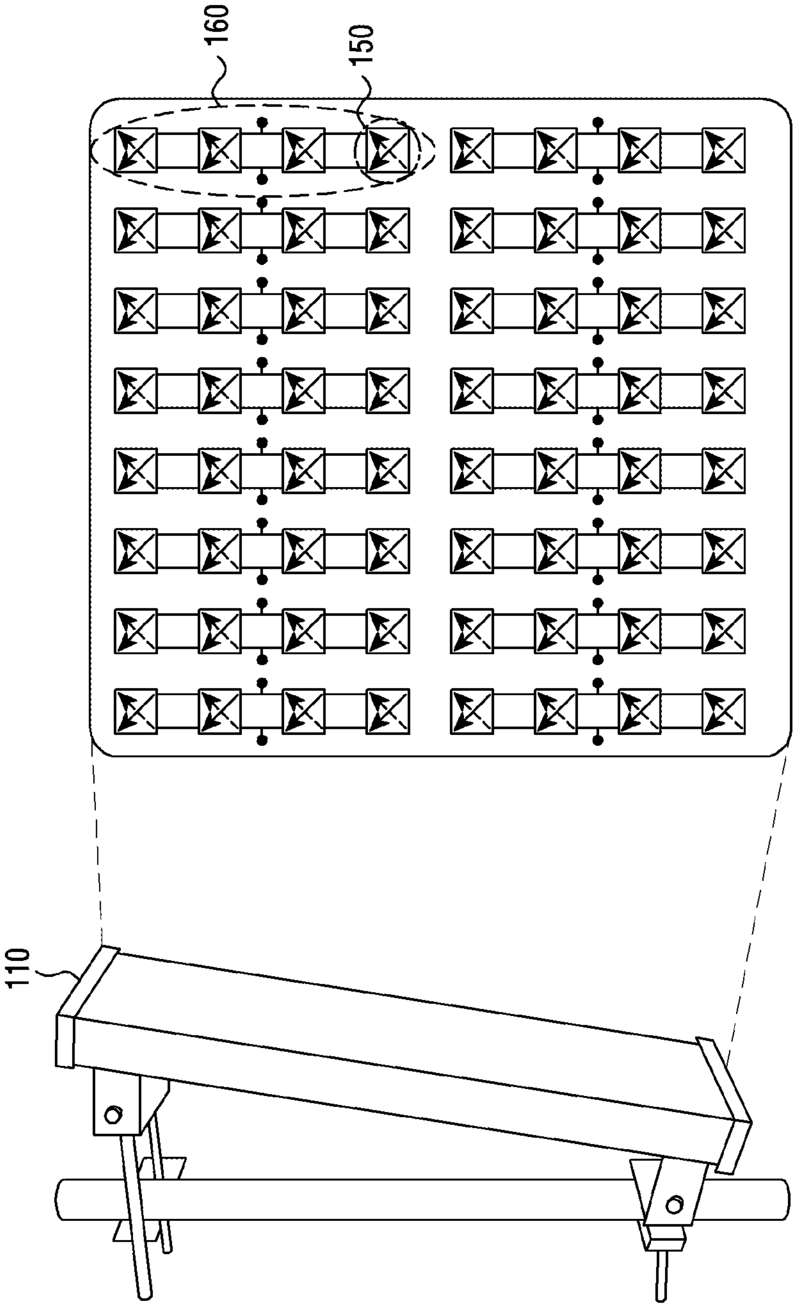
FIG. 1B is a diagram illustrating an example of an electronic device configuration including a plurality of antenna elements in a wireless communication system according to various embodiments.

FIG. 1B is a diagram illustrating an example of an electronic device configuration including a plurality of antenna elements in a wireless communication system according to various embodiments. The electronic device may be a massive multiple input multiple output (MIMO) unit (MMU) or a millimeter wave (mmWave) device. A term such as '~unit' or '~er' used hereafter indicates a unit for processing at least one function or operation, and may be implemented using hardware, software, or a combination of hardware and software.

Referring to FIG. 1B, the base station 110 according to an embodiment may include a plurality of antenna elements 150. To increase a beamforming gain, a greater number of the antenna elements 150 may be used compared to input ports. A MMU device including sub arrays 160 each corresponding to one input port is described as an example of the electronic device of the present disclosure to explain various embodiments of the present disclosure. It is described that each sub array 160 of the MMU device includes the antenna elements 150 in the same number, but embodiments of the present disclosure are not limited thereto. According to an embodiment, the antenna elements 150 of some sub array 160 may be different in number from the antenna elements 150 of other sub array 160.

Although not depicted in FIG. 1B, the MMU device may include a radio unit (RU) and an antenna filter unit (AFU). The RU may include a radio frequency (RF) block and a power amplifier (PWR AMP) unit. The RF block may include a plurality of digital downlink converters (DDCs), a plurality of digital uplink converters (DUCs), a plurality of analog to digital converters (ADCs), a plurality of DCs, and a plurality of UCs. The PWR AMP unit may include a power amplifier (PA) and low-noise amplifiers (LNAs). The RU may correspond to an RF processing unit 813 of FIG. 8. The AFU may include a filter unit and an antenna unit (Ant). The filter unit may include a filter and a switch, and the antenna unit may include at least one antenna arrays. Each antenna array may include a plurality of sub arrays, and each sub array may include a plurality of antenna elements. The AFU may correspond to a filter unit 812 and an antenna unit 811 of FIG. 8.

Although not depicted in FIG. 1B, the MMU device may include a main PCB. Herein, the main PCB may be referred to as a main board, a mother board, and so on. An antenna substrate may be disposed on the main PCB. In other words, the RU of the MMU device may include the main PCB. An RF signal processed from an RF integrated circuit (RFIC) disposed on the main PCB may pass through the main PCB and be forwarded to a power divider of the antenna substrate. The power divider may feed the received RF signal to a plurality of antenna elements.

The MMU device is described by way of example to ease the description in the present disclosure. However, the present disclosure is not limited thereto, and may embrace all of a structure including a plurality of antennal elements and an electronic device including the structure. In other words, a device adopting a structure including asymmetry antenna elements according to embodiments of the present disclosure is not limited to the MMU. That is, it may be also applied to an MMU using a signal of a frequency range (FR) 1 band (about 6 GHz) and an mmWave device using a signal (about 24 GHz) of an FR2 band. The MMU device is described by way of example to ease the description in the present disclosure. However, the present disclosure is not limited thereto, and may embrace all of a structure including a plurality of antennal elements and an electronic device including the structure.

Referring to FIG. 1B, the sub array 160 may include the plurality of the antenna elements 150. Hereafter, FIG. 1B describes antenna elements arranged in a 4×1 form as one sub array 160, which is only for the description of embodiments of the present disclosure, and the corresponding illustration does not intend to limit the present disclosure. It is noted that various embodiments to be described may also be applied to the sub array 160 of 2×2 or 3×2 form.

The number of the antenna elements 150 of an equipment for performing wireless communication is increasing to raise communication performance. In addition, as RF parts, or components for processing an RF signal received or transmitted through each antennal element 150 increases in number, it is essentially required to satisfy the communication performance and to achieve spatial gain and cost efficiency in configuring the communication equipment. To meet such requirements, a dual-polarized antenna may be used. As channel independency between different polarization signals is satisfied, a polarization diversity and its signal gain may increase. Herein, the different polarizations may include co-polarization (co-pol) and cross-polarization (X-pol or cross-pol). The co-pol may indicate desired polarization of a wave radiated by the antenna (e.g., an antenna element, a sub array, an antenna array). The cross-pol may indicate polarization orthogonal to the co-pol. In other words, the cross-pol may indicate the polarization orthogonal to the desired polarization of the wave. For example, if the co-pol is vertical polarization, the cross-pol may be vertical polarization. In addition, if the co-pol is right hand circularly polarization, the cross-pol may be left hand circularly polarization. Hereafter, the co-pol may be referred to as positive (P)-polarization, and the cross-pol may be referred to as negative (N)-polarization.

To increase the beamforming gain of the electronic device (e.g., the MMU device), the number of the antenna elements 150 mounted in the electronic device may increase. However, a specific interval may be required between the antenna elements 150, for the radiation performance of the electronic device. In other words, if the interval between the antenna elements 150 gets smaller than the specific interval, the radiation performance of the antenna element 150 and the antenna structure including the same or the electronic device may be deteriorated. In addition, if the plurality of the antenna elements 150 is mounted, a volume of the electronic device may increase. Hence, an antenna structure including an asymmetry antenna element and an electronic device including the same for mounting a great number of antenna elements 150 and improving radiation performance are disclosed.

Hereafter, FIGS. 2A, 2B, 3A and FIG. 3B include graphs illustrating a cross-polarization ratio (CPR) (or, a XPR) which may refer to a gain difference between the co-pol and the cross-pol and a CPR value based on antenna element structure and array.

Figure 2A:
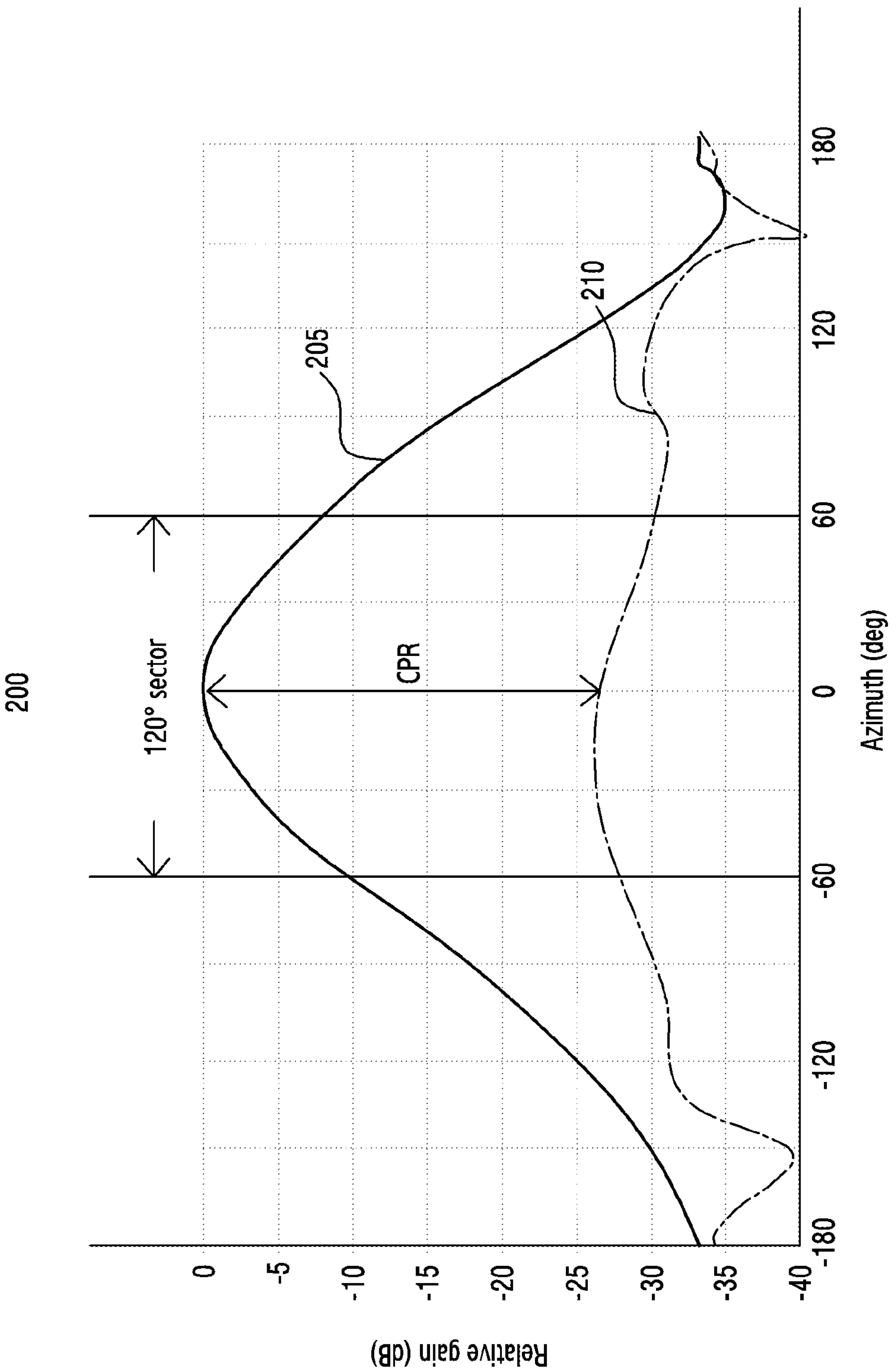
FIG. 2A is a graph illustrating an example cross polarization ratio (CPR) of an antenna element according to various embodiments FIG. 2B includes graphs illustrating examples of a CPR according to a structure of an antenna element according to various embodiments.

FIG. 2A is a graph illustrating an example CPR of an antenna element according to various embodiments. The CPR may be referred as a level difference between the co-pol and the cross-pol in a specific direction.

A horizontal axis of a graph 200 may be referred as an angle (or an angle on an azimuth plane) (unit: degree, °) based on the z axis on the xy plane, and a vertical axis may be referred as a relative gain (unit: decibel (dB)). The graph 200 includes a first line 205 indicating a co-polarization gain, and a second line 210 indicating a cross-polarization gain. The cross-pol component gain may be defined as a decibel difference between maximum radiation intensities of the cross-pol component and the co-pol component.

Referring to FIG. 2A, at 0° which is a reference direction (z-axis direction), the gain of the first line 205 may be about 0 dB, and the gain of the second line 210 may be about −26 dB. The CPR at 0° may be about 26 dB. In 30° direction, the gain of the first line 205 may be about −3 dB, and about −28 dB. The CPR at 30° may be about 25 dB. In 60° direction, the gain of the first line 205 may be about −8 dB, and about −30 dB. The CPR at 60° may be about 22 dB. Also, in −30° direction, the gain of the first line 205 may be about −3 dB, and about −26 dB. The CPR at −30° may be about 23 dB. In −60° direction, the gain of the first line 205 may be about −10 dB, and about −28 dB. The CPR at −60° may be about 18 dB.

As described above, the CPR may differ depending on the angle on the azimuth plane. For example, the CPR may be formed as a high value in the reference direction θ°. In addition, the CPR may typically have a low value away from the reference direction. Herein, the high CPR value may be understood as good orthogonal characteristic in the wireless communication system environment, and accordingly may indicate considerable throughput. Thus, the electronic device needs to satisfy a reference value or a threshold value of the CPR required by the communication environment, according to the communication environment. For example, the threshold value of the CPR may be 20 dB in the reference direction, the threshold may be 15 dB at 30° or −30°, or the threshold value may be 10 dB at 60° or −60°.

In addition, the CPR may be understood the same as or similar to polarization purity. For example, an antenna (or an electronic device including the same) having complete polarization purity may be 0 in the cross-pol value. The CPR may increase as the co-pol component increases or the cross-pol component lowers. In addition, the CPR may increase as the polarization purity increases. In short, if the co-pol component is dominant, the polarization purity may be high and accordingly the CPR may be high. Hence, the dominant co-pol component may indicate high communication performance of the electronic device or the antenna.

Figure 2B:
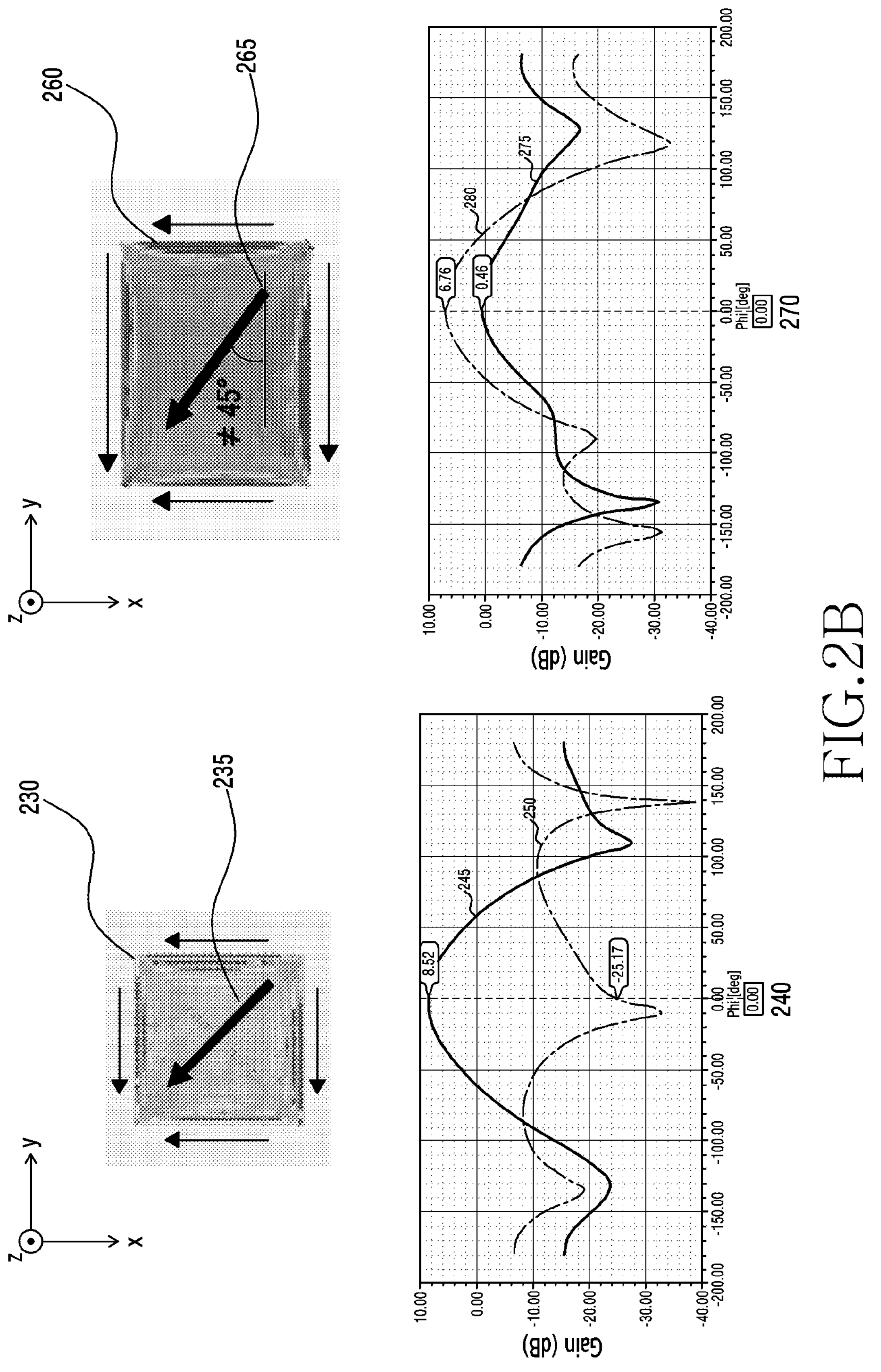

FIG. 2B includes graphs illustrating the CPR according to an antenna element structure according to various embodiments. Herein, the CPR may indicate a level difference between the co-pol and the cross-pol in a specific direction. A horizontal axis of a graph 240 and a graph 270 may be referred as the angle (or the angle on the azimuth plane) (unit: degree, °) based on the z axis on the xy plane, and a vertical axis may be referred as the gain (unit: dB). The cross-pol component gain may be defined as the decibel difference between the maximum radiation intensities of the cross-pol component and the co-pol component.

To ease description, the present disclosure hereafter describes an antenna element which is a patch antenna by way of example. However, the present disclosure is not limited thereto, and the antenna element may be configured with various antennas. For example, the antenna element may be a stacked patch antenna. The antenna element may be an L-probe feeding antenna.

Referring to FIG. 2B, a first antenna element 230 according to an embodiment may be a patch antenna having a symmetry structure. For example, the first antenna element 230 may be 1:1 in a ratio between a length of a horizontal (e.g., y-axis direction) edge (e.g., a first edge) and a length of a vertical (e.g., x-axis direction) edge (e.g., a second edge) in a square shape. A second antenna element 260 may be a patch antenna having an asymmetry structure. For example, the second antenna element 260 may be 1:0 (n is other value than 1) in the ratio between the length of the horizontal edge and the length of the vertical edge in a rectangle shape. Herein, the length of the edge may include either a physical length or an electrical length.

If an electrical current is fed at one point of a right lower end of the first antenna element 230, the fed current may flow along the first edge and then flow toward one point of a left upper end through the second edge. A vector component 235 of the current may be formed 45°. If an electrical current is fed at one point of a right lower end of the second antenna element 260, the fed current may flow along the first edge and then flow toward one point of a left upper end through the second edge. Hence, a vector component 265 of the current may be formed lower than 45°. In the second antenna element 260 of FIG. 2B, n smaller than 1 (e.g., the width is longer than the height) is illustrated by way of example, the current vector component 265 may be formed lower than 45°. If n is greater than 1, the current vector component 265 may be formed higher than 45°. As mentioned above, the first antenna element 230 having the symmetry structure and the second antenna element 260 having the asymmetry structure may have different electrical properties. The CPR based on the reference direction (e.g., z-axis direction) angle for the first antenna element 230 and the second antenna element 260 may be formed as shown in the graph 240 and the graph 270 respectively.

The graph 240 shows a first line 245 indicating the co-pol gain of the first antenna element 230 based on the reference direction (e.g., +z direction out of the page) angle and a second line 250 indicating the cross-pol gain of the first antenna element 230 based on the reference direction angle. Referring to the graph 240, at 0° which is the reference direction (z-axis direction), the gain of the first line 245 may be about 8.52 dB, and the gain of the second line 250 may be about −25.17 dB. The CPR at 0° may be about 33.69 dB. The graph 270 shows a third line 275 indicating the co-pol gain of the second antenna element 260 based on the reference direction (e.g., +z direction out of the page) angle and a fourth line 280 indicating the cross-pol gain of the second antenna element 260 based on the reference direction angle. Referring to the graph 270, at 0° which is the reference direction (z-axis direction), the gain of the third line 275 may be about 6.76 dB, and the gain of the fourth line 250 may be about 0.46 dB. The CPR at 0° may be about 6.3 dB.

As described above, if the antenna element structure is the symmetry structure, the electrical vector component may be formed 45°, and thus the high CPR value may be attained. Hence, the polarization purity may be high. However, if the antenna element structure is the asymmetry structure, the electrical vector component may be formed differently from 45°, and accordingly the antenna element may have the low CPR value. The polarization purity may be low. In result, if the antenna element structure is the asymmetry structure, since the polarization purity and the CPR may be low, the throughput of the antenna (e.g., the antenna element) may be reduced, and thus the radiation performance of the antenna and the electronic device including the same may be deteriorated.

Figure 3A:
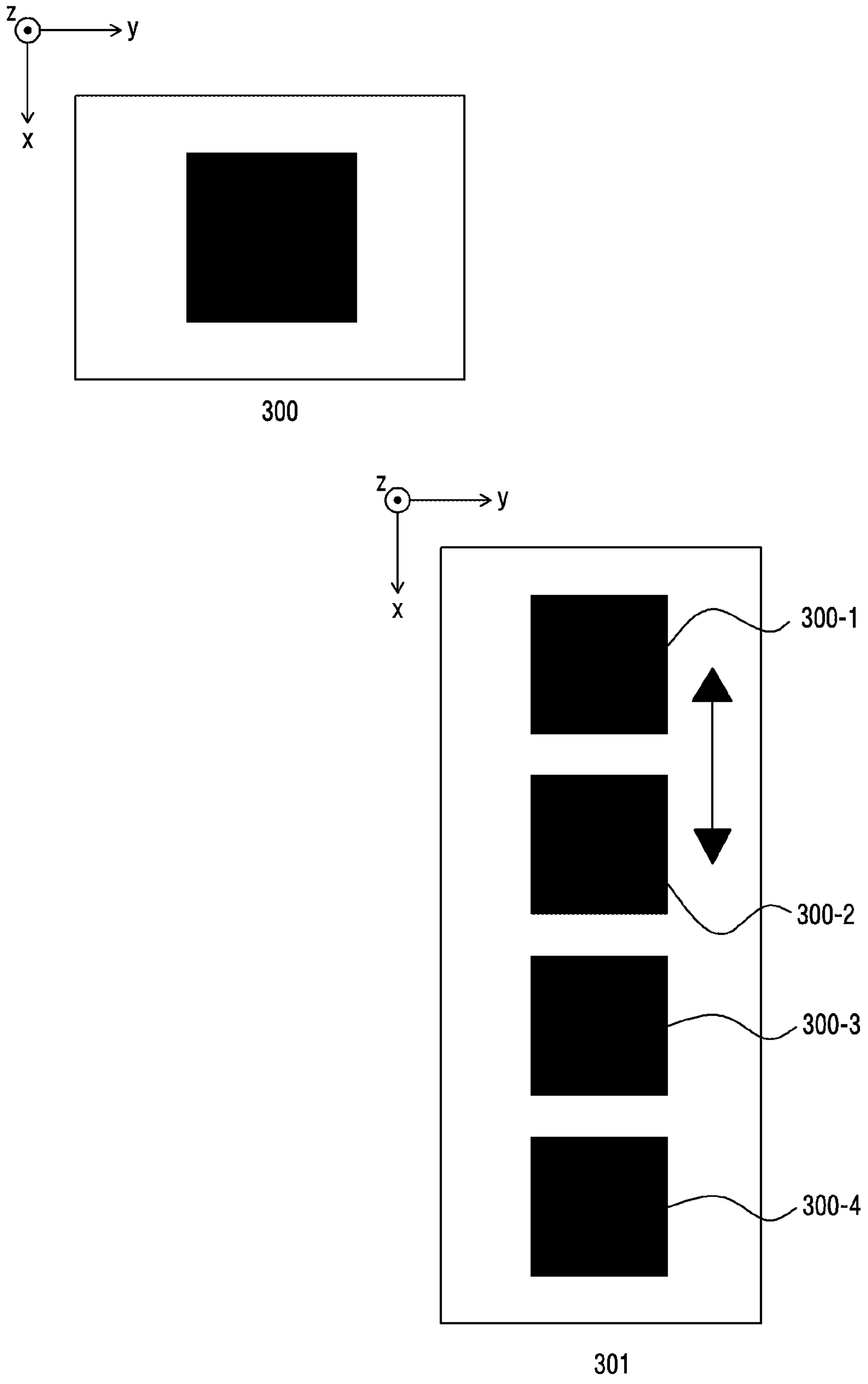
FIG. 3A is a diagram illustrating an example of an antenna element structure and a structure including a plurality of antenna elements according to various embodiments.

FIG. 3A is a diagram illustrating an example of an antenna element structure and a structure including a plurality of antenna elements according to various embodiments. An antenna element 300 and antenna elements 300-1, 300-1, 300-3, and 300-4 of FIG. 3A may be understood in the same manner as the first antenna element 230 of FIG. 2B. Hence, the antenna elements shown in FIG. 3A may be understood as symmetry antenna elements.

To ease description, the present disclosure hereafter describes the antenna element which is a patch antenna by way of example. However, the present disclosure is not limited thereto, and the antenna element may be configured with various antennas. For example, the antenna element may be a stacked patch antenna. The antenna element may be an L-probe feeding antenna.

Referring to FIG. 3A, the antenna according to an embodiment may include one antenna element 300 or a sub array (or an array) 301 including a plurality of antenna elements. As mentioned above, the electronic device may use an antenna including a plurality of antenna elements to form a fine beam in beamforming or to minimize and/or reduce gain loss occurring in using a high frequency band signal. However, the antenna including the plurality of the antenna elements may require a specific interval between the antenna elements. Herein, the specific interval may, for example, be about λ/2, if a wavelength of a signal radiate by the antenna is λ. The specific interval may be a threshold value for the interval between the antenna elements. The specific interval may indicate a distance from the center of one antenna element to the center of other adjacent antenna element, and the other adjacent antenna element may indicate an antenna element positioned close in the x-axis or y-axis direction. For example, the antenna element 300-1 and the antenna element 300-2 may be adjacent antenna elements. However, the antenna element 300-1 and the antenna element 300-2 may not be adjacent antenna elements.

As described above, an electronic device including a plurality of antenna elements may have higher radiation performance than an electronic device including a single antenna element. However, if the plurality of the antenna elements is disposed narrower than the specific interval, the radiation performance of the electronic device may be deteriorated. Hereafter, including a single antenna element and including a plurality of antenna elements shall be described in greater detail below with reference to FIG. 3B.

Figure 3B:
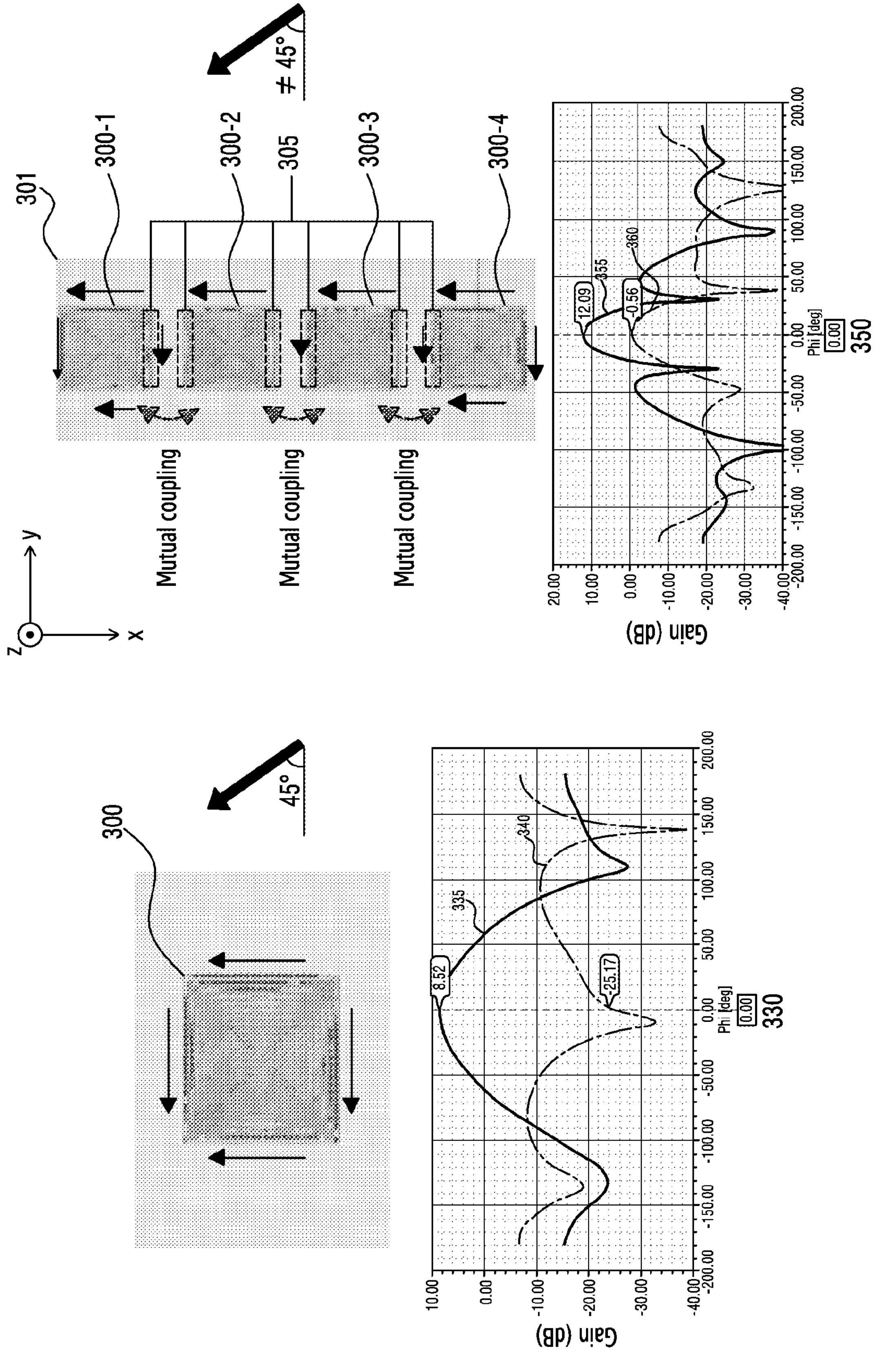
FIG. 3B includes graphs illustrating examples of a CPR based on an antenna element array according to various embodiments.

FIG. 3B includes graphs illustrating an example CPR based on the antenna element array according to various embodiments.

The CPR may indicate the level difference between the co-pol and the cross-pol in a specific direction. A horizontal axis of a graph 330 and a graph 350 indicates the angle (or the angle on the azimuth plane) (unit: degree, °) based on the z axis on the xy plane, and a vertical axis indicates the gain (unit: dB). The cross-pol component gain may be defined as the decibel difference between the maximum radiation intensities of the cross-pol component and the co-pol component.

The antenna element 300 of FIG. 3B may be understood the same as the antenna element 300 of FIG. 3A, and the sub array 301 of FIG. 3B may be understood the same as the sub array 301 of FIG. 3A. The antenna element 300 and the antenna elements 300-1, 300-1, 300-3, and 300-4 of the sub array 301 each may be a patch antenna having a symmetry structure. For example, the antenna element 300 and the antenna elements 300-1, 300-1, 300-3, and 300-4 each may be 1:1 in the ratio between the length of the horizontal (e.g., y-axis direction) edge (e.g., a first edge) and the length of the vertical (e.g., x-axis direction) edge (e.g., a second edge) in a square shape. Herein, the length of the edge may include either the physical length or the electrical length.

If an electrical current is fed at one point of a right lower end of the antenna element 300, the fed current may flow along the first edge and then flow toward one point of a left upper end through the second edge. Hence, the current vector component may be formed 45°. If an electrical current is fed at one point of a right lower end of the antenna elements 300-1, 300-1, 300-3, and 300-4 of the sub array 301, the fed current may flow along the first edge and then flow toward one point of a left upper end through the second edge. Hence, the current vector component of the antenna elements 300-1, 300-1, 300-3, and 300-4 may be formed lower or higher than 45°. As mentioned above, if the interval between the antenna elements 300-1, 300-1, 300-3, and 300-4 is disposed smaller than a specific interval (e.g., λ/2) even in the antenna element having the symmetry structure, the sub array 310 may have different electrical properties from one antenna element 300 disposed alone. The sub array 301 which arrays the same antenna elements as the antenna element 300 in a plural number may have different electrical properties from one antenna element 300 disposed alone, due to mutual coupling occurring in a region 305.

The CPR based on the reference direction (e.g., z-axis direction) angle for the antenna element 300 and the sub array 301 is shown in the graph 330 and the graph 350.

The graph 330 according to an embodiment shows a first line 335 indicating the co-pol gain of the antenna element 300 based on the reference direction (e.g., +z direction out of the page) angle and a second line 340 indicating the cross-pol gain of the antenna element 300 based on the reference direction angle.

Referring to the graph 330 according to an embodiment, at 0° which is the reference direction (z-axis direction), the gain of the first line 335 may be about 8.52 dB, and the gain of the second line 340 may be about −25.17 dB. The CPR at 0° may be about 33.69 dB.

The graph 350 according to an embodiment shows a third line 355 indicating the co-pol gain of the sub array 301 based on the reference direction (e.g., +z direction out of the page) angle and a fourth line 360 indicating the cross-pol gain of the sub array 301 based on the reference direction angle.

Referring to the graph 350, at 0° which is the reference direction (z-axis direction), the gain of the third line 355 may be about 12.09 dB, and the gain of the fourth line 360 may be about −0.56 dB. The CPR at 0° may be about 12.65 dB. In the sub array 301, as the interval between the antenna elements 300-1, 300-1, 300-3, and 300-4 is formed narrower than the specific interval and the mutual coupling between the antenna elements 300-1, 300-1, 300-3, and 300-4 is formed, the CPR may be formed lower than the antenna element 300. For example, the mutual coupling may occur in the region 305 between the antenna element 300-1 and the antenna element 300-2, between the antenna element 300-2 and the antenna element 300-3, and the antenna element 300-3 and the antenna element 300-4, and the CPR of the sub array 301 may be formed low by the region 305 where the mutual coupling occurs. In other words, the radiation performance of the sub array 301 may be deteriorated by the mutual action (mutual coupling) occurring as the interval between the antenna elements 300-1, 300-1, 300-3, and 300-4 reduces.

As mentioned above, even if the antenna element structure is the symmetry structure, the low electrical vector component may be formed differently from 45° according to the array of the plurality of the antenna elements, and thus the sub array may have the low CPR value. That is, the polarization purity may be low. As a result, if the plurality of the antenna elements is included but the interval between the antenna elements is smaller than the specific interval, since the polarization purity and the CPR may be low, the throughput of the antenna (e.g., the sub array or the array antenna) may be reduced, and accordingly the radiation performance of the antenna and the electronic device including the same may be deteriorated.

Referring to FIG. 2B through FIG. 3B, if the structure of each antenna element has the asymmetry structure, or the antenna element having the symmetry structure arrays the plurality of the antenna elements at the interval smaller than the specific interval, the antenna radiation performance may be degraded. In the related art, the radiation performance of the antenna or the electronic device has been improved using an antenna element in which slots are inserted on a surface of a patch antenna, or by inserting an additional reflector around the antenna element. However, the structure using the slot patch antenna or the reflector may require an additional process, cause a tolerance because the process is not simple, and increase a production cost. Hence, what is demanded is a structure for allowing production through a simpler process, minimizing and/or reducing the production cost, and improving the radiation performance. Hereafter, the present disclosure suggests a structure (hereafter, a structure including asymmetry antenna elements) for improving antenna radiation performance, by arraying antenna elements formed in an asymmetry structure at an interval smaller than a specific interval.

Figure 4A:
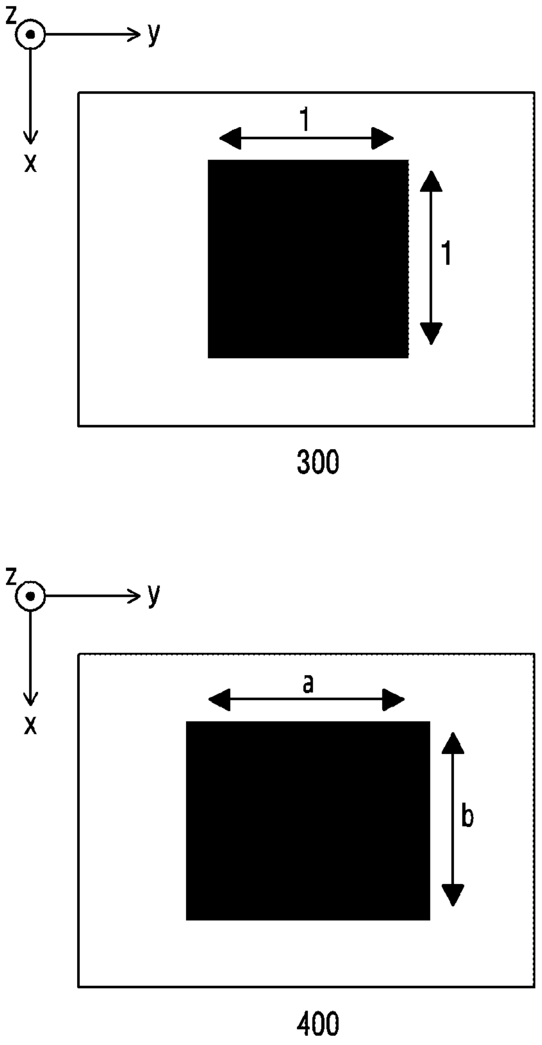
FIG. 4A is a diagram illustrating an example of an asymmetry antenna element according to various embodiments.

FIG. 4A is a diagram illustrating an example of an asymmetry antenna element according to various embodiments.

An antenna element 300 of FIG. 4A may be understood in the same manner as the first antenna element 230 of FIG. 2B, the antenna element 300 of FIG. 3A, and the antenna element 300 of FIG. 3B. The antenna element of FIG. 4A may be understood in the same manner as the second antenna element 260 of FIG. 2B.

To ease explanation, the present disclosure describes the antenna element which is a patch antenna by way of example. However, the present disclosure is not limited thereto, and the antenna element may be configured with various antennas. For example, the antenna element may be a stacked patch antenna. Alternatively, the antenna element may be an L-probe feeding antenna.

Referring to FIG. 4A, the antenna element 300 according to an embodiment may be a patch antenna having a symmetry structure. For example, the antenna element 300 may be 1:1 in a ratio between a length of a horizontal (e.g., y-axis direction) edge (e.g., a first edge) and a length of a vertical (e.g., x-axis direction) edge (e.g., a second edge) in a square shape. An antenna element 400 may be a patch antenna having an asymmetry structure. For example, the antenna element 400 may be a:b (a is a different value from b) in the ratio between the length of the horizontal edge and the length of the vertical edge in a rectangle shape. Herein, the length of the edge may include either the physical length or the electrical length.

Figure 4B:
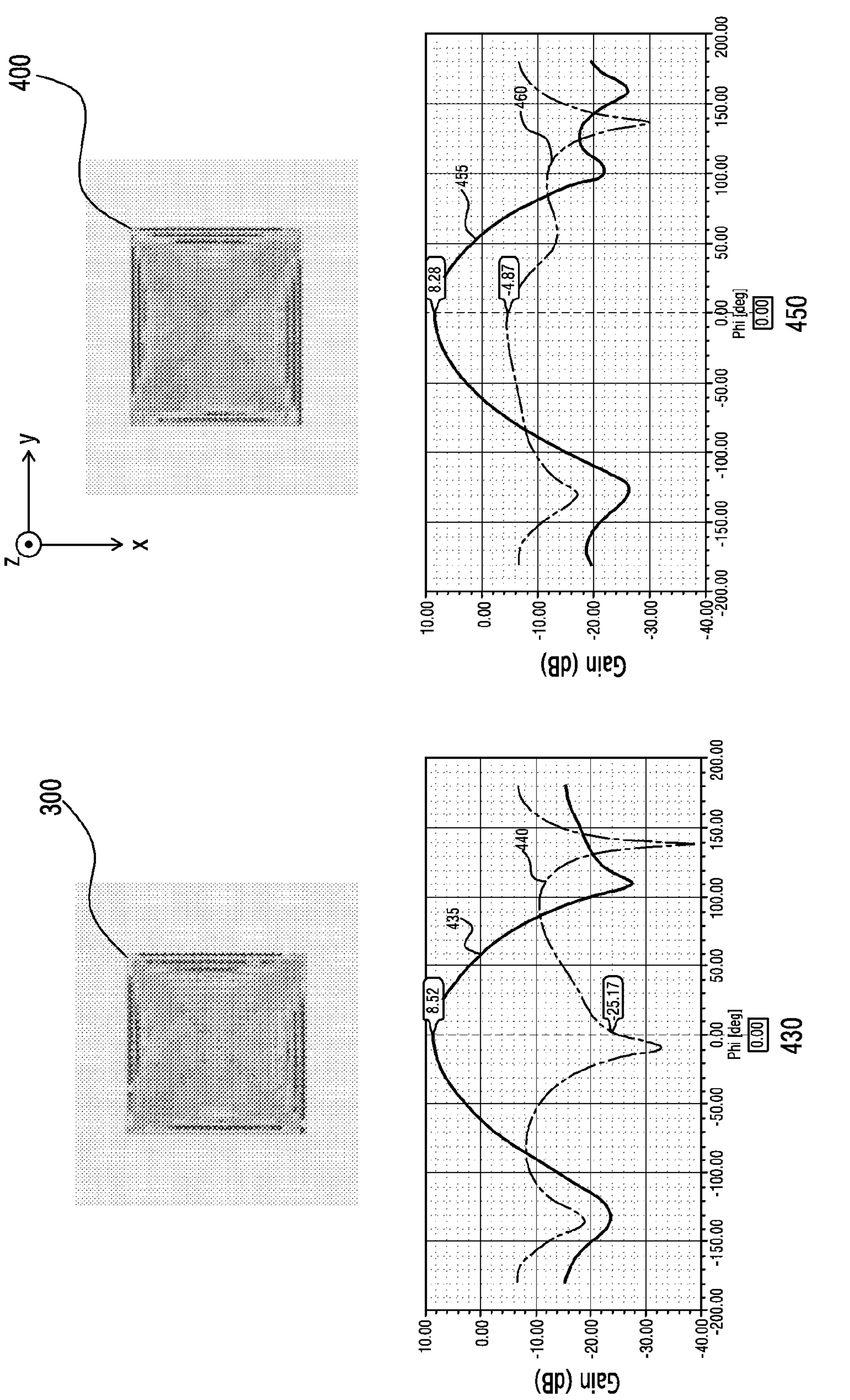
FIG. 4B includes graphs examples of a CPR of an asymmetry antenna element according to various embodiments.

FIG. 4B includes graphs illustrating examples of CPR of the asymmetry antenna element according to various embodiments.

The CPR may indicate the level difference between the co-pol and the cross-pol in a specific direction. A horizontal axis of a graph 430 and a graph 450 indicates the angle (or the angle on the azimuth plane) (unit: degree, °) based on the z axis on the xy plane, and a vertical axis indicates the gain (unit: dB). The cross-pol component gain may be defined as the decibel difference between the maximum radiation intensities of the cross-pol component and the co-pol component.

The antenna element 300 of FIG. 4B may be understood in the same manner as the antenna element 300 of FIG. 4A, the antenna element 300 of FIG. 3A, and the antenna element 300 of FIG. 3B. The antenna element 400 of FIG. 4B may be understood in the same manner as the antenna element 400 of FIG. 4A. The antenna element 300 may be a patch antenna having a symmetry structure. For example, the antenna element 300 may be 1:1 in the ratio between the length of the horizontal (e.g., y-axis direction) edge (e.g., a first edge) and the length of the vertical (e.g., x-axis direction) edge (e.g., a second edge) in a square shape. Herein, the length of the edge may include either the physical length or the electrical length.

According to an embodiment, the antenna element 400 may be a patch antenna having an asymmetry structure. For example, the antenna element 400 may be a:b (a is a different value from b) in the ratio between the length of horizontal edge (e.g., a first edge) and the length of the vertical edge (e.g., a second edge) in a rectangle shape. Herein, the length of the edge may include either the physical length or the electrical length. According to an embodiment, the ratio between the first edge and the second edge of the antenna element 400 may be determined based on the CPR value. For example, the value of b/a may be a value $0.8 \le b/a \le 1.2$ greater than or equal to 0.8 or smaller than or equal to 1.2.

The CPR based on the reference direction (e.g., z-axis direction) angle for the antenna element 300 and the antenna element 400 is shown in the graph 430 and the graph 450.

According to an embodiment, the graph 430 shows a first line 435 indicating the co-pol gain of the antenna element 300 based on the angle for the reference direction (e.g., +z direction out of the page) and a second line 440 indicating the cross-pol gain of the antenna element 300 based on the reference direction angle. Referring to the graph 430, at 0° which is the reference direction (z-axis direction), the gain of the first line 435 may be about 8.52 dB, and the gain of the second line 440 may be about −25.17 dB. The CPR at 0° may be about 33.69 dB.

According to an embodiment, the graph 450 shows a third line 455 indicating the co-pol gain of the antenna element 400 based on the reference direction (e.g., +z direction out of the page) angle and a fourth line 460 indicating the cross-pol gain of the antenna element 400 based on the reference direction angle. Referring to the graph 450, at 0° which is the reference direction (z-axis direction), the gain of the third line 455 may be about 8.28 dB, and the gain of the fourth line 460 may be about −4.87 dB. The CPR at 0° may be about 13.15 dB.

As described above, if the antenna element structure is the symmetry structure, the high CPR value may be attained, compared to the asymmetry structure. In other words, the symmetry antenna element may have higher polarization purity than the asymmetry antenna element. If the antenna element structure is the asymmetry structure, the polarization purity and the CPR may be low, and accordingly the throughput of the antenna (e.g., the antenna element) may be reduced. Thus, the radiation performance of the antenna and the electronic device including the same may be deteriorated. However, the sub array which arrays the antenna element 300 and the antenna elements 400 of FIG. 4B in a plural number may rather improve the radiation performance. Hereafter, FIG. 5 describes the CPR in a sub array which arrays antenna elements.

Figure 5:
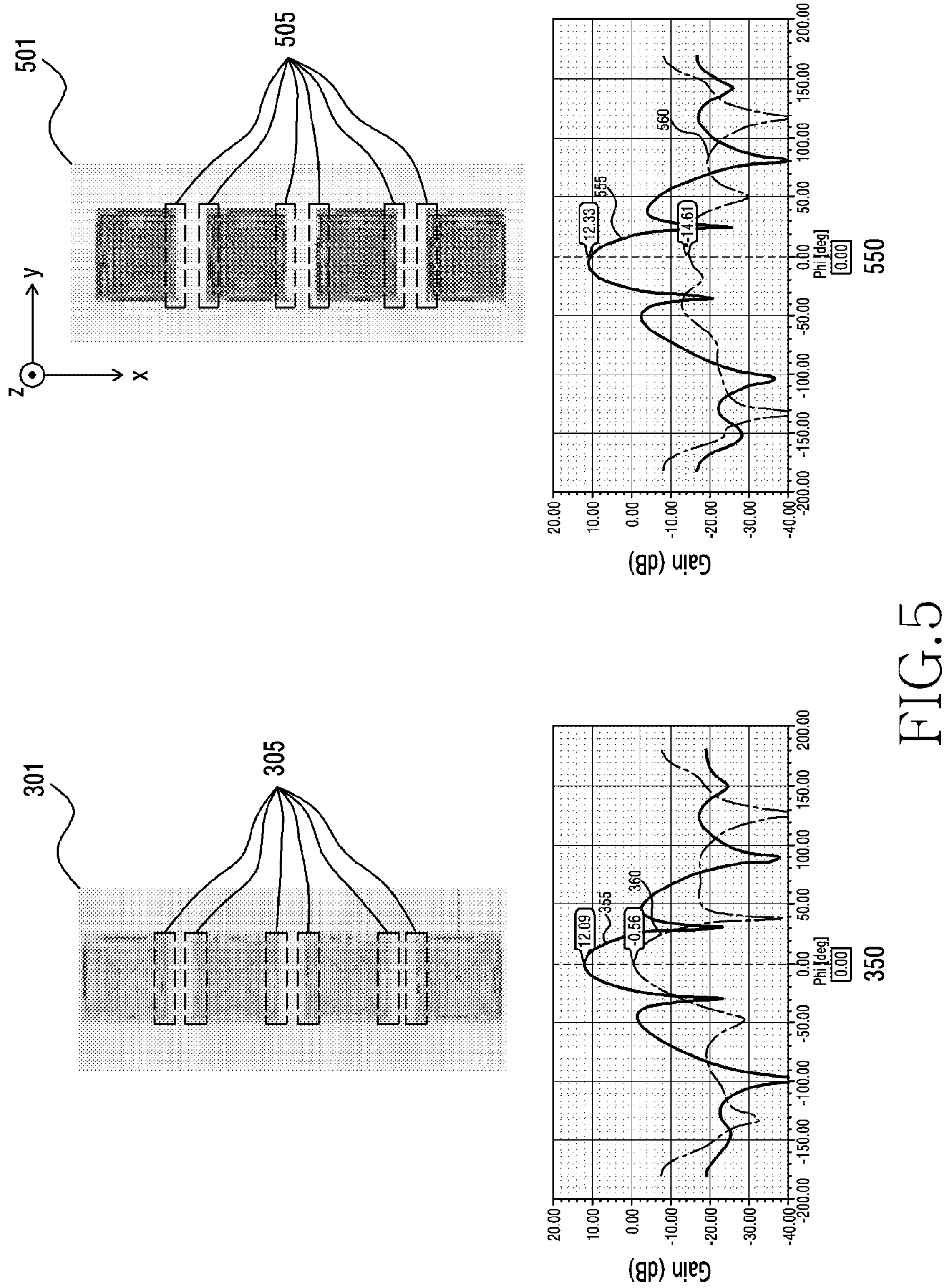
FIG. 5 includes graphs illustrating examples of a CPR of a structure including a plurality of asymmetry antenna elements according to various embodiments.

FIG. 5 includes graphs illustrating examples of a CPR of a structure including a plurality of asymmetry antenna elements according to various embodiments.

The CPR may indicate the level difference between the co-pol and the cross-pol in a specific direction. A horizontal axis of a graph 350 and a graph 550 may indicate the angle (or the angle on the azimuth plane) (unit: degree, °) based on the z axis on the xy plane, and a vertical axis may indicate the gain (unit: dB). The cross-pol component gain may be defined as the decibel difference between the maximum radiation intensities of the cross-pol component and the co-pol component.

A sub array 301 of FIG. 5 may be understood in the same manner as the sub array 301 of FIG. 3B. For example, the sub array 301 may include antenna elements which are patch antennas having a symmetry structure. According to an embodiment, the sub array 501 of FIG. 5 may include the antenna element 400 of FIG. 4. For example, the sub array 501 may include antenna elements being patch antennas having an asymmetry structure.

The graph 350 shows a first line 355 indicating the co-pol gain of the sub array 301 based on the reference direction (e.g., +z direction out of the page) angle and a second line 360 indicating the cross-pol gain of the sub array 301 based on the reference direction angle. Referring to the graph 350, at 0° which is the reference direction (z-axis direction), the gain of the first line 355 may be about 12.09 dB, and the gain of the second line 360 may be about −0.56 dB. The CPR at 0° may be about 12.65 dB. The graph 550 shows a third line 555 indicating the co-pol gain of the sub array 501 based on the reference direction (e.g., +z direction out of the page) angle and a fourth line 560 indicating the cross-pol gain of the sub array 501 based on the reference direction angle. Referring to the graph 550, at 0° which is the reference direction (e.g., z-axis direction), the gain of the third line 555 may be about 12.33 dB, and the gain of the fourth line 560 may be about −14.61 dB. The CPR at 0° may be about 26.94 dB.

In the sub array 301, the antenna element may be arrayed to form a narrower interval between the antenna elements than a specific interval (e.g., λ/2, where λ is a wavelength of a signal transmitted and received by the sub array 301). The sub array 301 may form the low CPR according to a region 305 in which mutual coupling is formed between the antenna elements. In other words, the sub array 301 may be deteriorated in the radiation performance due to the mutual action (mutual coupling) occurring as the interval between the antenna elements reduces.

According to an embodiment, the sub array 501 may array the antenna elements to form a narrower interval between the antenna elements than a specific interval (e.g., λ/2, where λ is a wavelength of a signal transmitted and received by the sub array 501). Mutual coupling between the antenna elements in a region 505 of the sub array 501 may be lower than the region 305. As each of the antenna elements of the sub array 501 is configured with the patch antenna having the asymmetry structure, the current vector component of each antenna element is not 45° but the current vector component sum of the sub array 501 may be 45°. Hence, the sub array 501 may have high radiation performance in the region 505 where the mutual coupling works than the region 305 of the sub array 301. Accordingly, the sub array 501 may have the higher CPR value than the sub array 301, and thus the polarization purity may be high.

As described above, the sub array 301 in which the antenna element structure is the symmetry structure may form the low electrical vector component differently from 45° according to the array of the plurality of the antenna elements, and accordingly the sub array may have the low CPR value. However, the sub array 501 in which the antenna element structure is the asymmetry structure may improve the CPR value of the sub array 501, if the plurality of the antenna elements is arrayed narrower than the specific interval. Hence, the sub array 501 may be higher in the polarization purity than the polarization purity of the sub array 301. Herein, the specific interval may be a half of the wavelength λ of the signal transmitted and received in the sub array 501. As a result, the subarray including the plurality of the antenna elements may increase in the CPR value, due to the antenna elements of the asymmetry structure even though the interval between the antenna elements is narrower than the specific interval. In other words, the throughput of the sub array may increase, and the radiation performance of the sub array may be improved. While the sub array is illustrated by way of non-limiting example to ease the explanation, the above details may be also applied to an array antenna including a plurality of sub arrays, an antenna, or an electronic device including the antenna of such a structure in the same manner.

Figure 6:
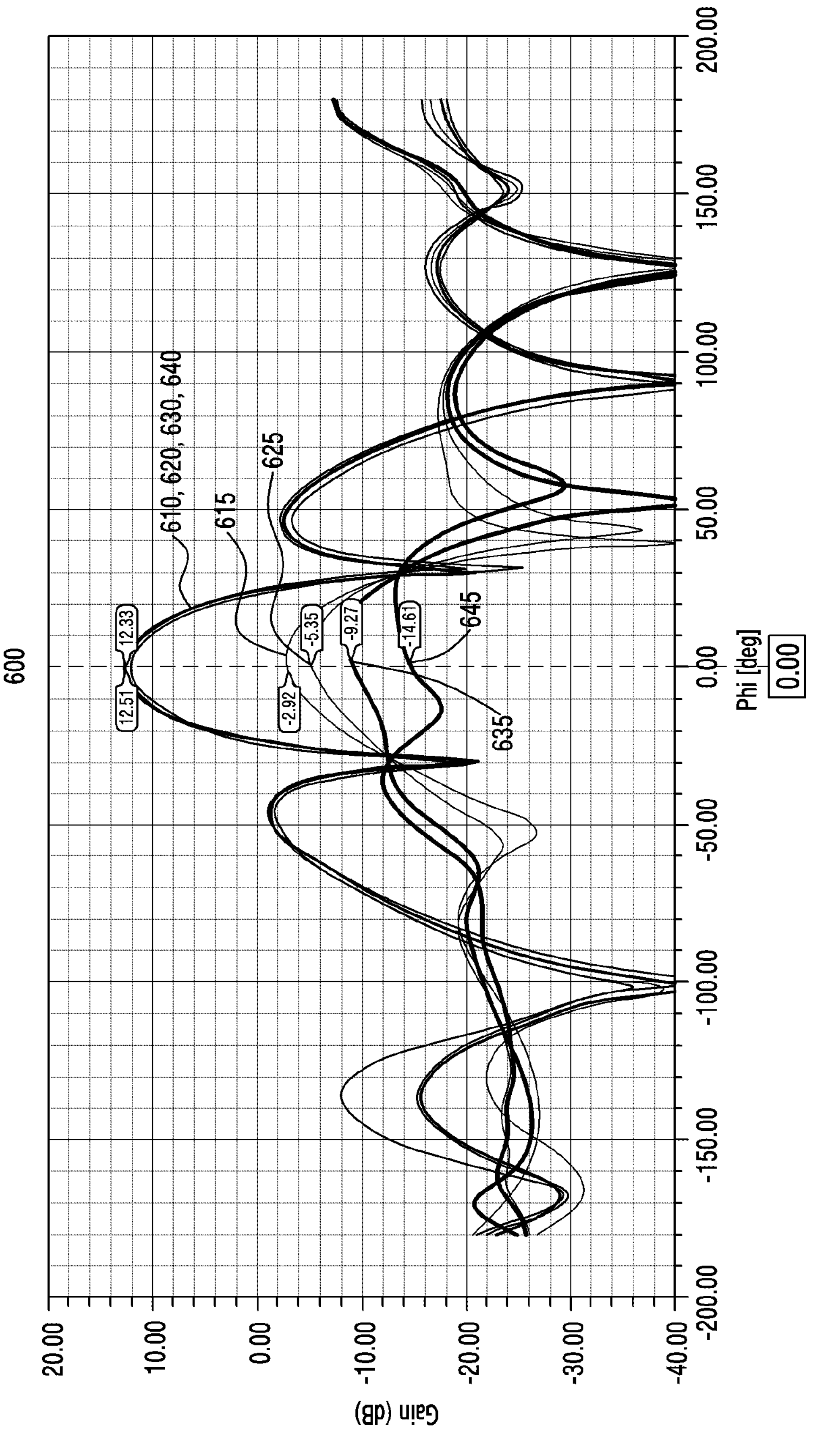
FIG. 6 is a graph illustrating a CPR based on an asymmetry level of an asymmetry antenna element according to various embodiments.

FIG. 6 is a graph illustrating example CPR based on an asymmetry level of an asymmetry antenna element according to various embodiments.

The CPR may indicate the level difference between the co-pol and the cross-pol in a specific direction. A horizontal axis of a graph 600 indicates the angle (or the angle on the azimuth plane) (unit: degree, °) based on the z axis on the xy plane, and a vertical axis indicates the gain (unit: dB). The cross-pol component gain may be defined as the decibel difference between the maximum radiation intensities of the cross-pol component and the co-pol component.

According to an embodiment, the graph 600 shows the CPR based on the asymmetry level of the electronic device including the asymmetry antenna elements. The antenna element may be the patch antenna having the asymmetry structure. For example, the antenna element may be a:b (a is a different value from b) in the ratio between the length of the horizontal edge (e.g., a first edge) and the length of the vertical edge (e.g., a second edge) in a rectangle shape. The length of the edge may include either the physical length or the electrical length. For example, a first line 610 and a fifth line 615 may be 1.04 in b/a. In addition, a second line 620 and a sixth line 625 may be 1.08 in b/a. In addition, a third line 630 and a seventh line 635 may be 1.12 in b/a. In addition, a fourth line 640 and an eighth line 645 may be 1.16 in b/a. Herein, b/a may be referred as an asymmetry ratio.

According to an embodiment, the graph 600 shows the first line 610 indicating the co-pol gain of the electronic device including the antenna elements having the asymmetry ratio of 1.04 based on the reference direction (e.g., +z direction out of the page) angle and the fifth line 615 indicating the cross-pol gain based on the reference direction angle. The graph 600 shows the second line 620 indicating the co-pol gain of the electronic device including the antenna elements having the asymmetry ratio of 1.08 based on the reference direction angle and the sixth line 625 indicating the cross-pol gain based on the reference direction angle. The graph 600 shows the third line 630 indicating the co-pol gain of the electronic device including the antenna elements having the asymmetry ratio of 1.12 based on the reference direction angle and the seventh line 635 indicating the cross-pol gain based on the reference direction angle. The graph 600 shows the fourth line 640 indicating the co-pol gain of the electronic device including the antenna elements having the asymmetry ratio of 1.16 based on the reference direction angle and the eighth line 645 indicating the cross-pol gain based on the reference direction angle.

Referring to the graph 600 according to an embodiment, at 0° which is the reference direction (z-axis direction), the gain of the first line 610 may be about 12.51 dB, the gain of the second line 620 may be about 12.51 dB, the gain of the third line 630 may be about 12.33 dB, and the gain of the fourth line 640 may be about 12.33 dB. In other words, the co-pol component gain may have similar values even if the asymmetry ratio changes. At 0° which is the reference direction (z-axis direction), the gain of the fifth line 615 may be about −2.92 dB, the gain of the sixth line 625 may be about −5.35 dB, the gain of the seventh line 635 may be about −9.27 dB, and the gain of the eighth line 645 may be about −14.61 dB. In other words, the cross-pol component gain may differ as the asymmetry ratio changes.

According to an embodiment, as the asymmetry ratio of the antenna element changes, the CPR value of the electronic device may vary. For example, if the asymmetry ratio is 1.04, the CPR value may be about 15.43 dB according to the first line 610 and the fifth line 615. In addition, if the asymmetry ratio is 1.08, the CPR value may be about 17.86 dB according to the second line 620 and the sixth line 625. In addition, if the asymmetry ratio is 1.12, the CPR value may be about 21.6 dB according to the third line 630 and the seventh line 635. In addition, if the asymmetry ratio is 1.16, the CPR value may be about 26.94 dB according to the fourth line 640 and the eighth line 645. As mentioned above, as the asymmetry ratio approaches the value 1.2, the CPR value may increase.

The graph 600 of FIG. 6 illustrates the antenna elements which are the patch antennas of the rectangle structure in which the horizontal edge length is longer than the vertical edge length such as 1.04, 1.08, 1.12, and 1.16 of the asymmetry ratio, but the present disclosure is not limited thereto. The antenna elements which are the patch antennas of the rectangle structure in which the vertical edge length is longer than the horizontal edge length such as 0.96, 0.92, 0.88, and 0.84 of the asymmetry ratio may be understood in the same manner. That is, the CPR value may increase as the asymmetry ratio approaches 0.8 or 1.2 value, compared to the asymmetry ratio of 1.

As mentioned above, the structure including the asymmetry antenna elements according to embodiments of the present disclosure may improve the radiation performance of the antenna and the electronic device including the same, by arraying the asymmetry antenna elements at the interval narrower than the specific interval. In addition, as the antenna elements are arrayed at the narrower intervals, a greater number of antenna elements may be mounted in the electronic device. Also, the structure including the asymmetry antenna elements according to embodiments of the present disclosure may reduce production cost and concurrently improve the radiation performance by simplifying the process.

Figure 7A:
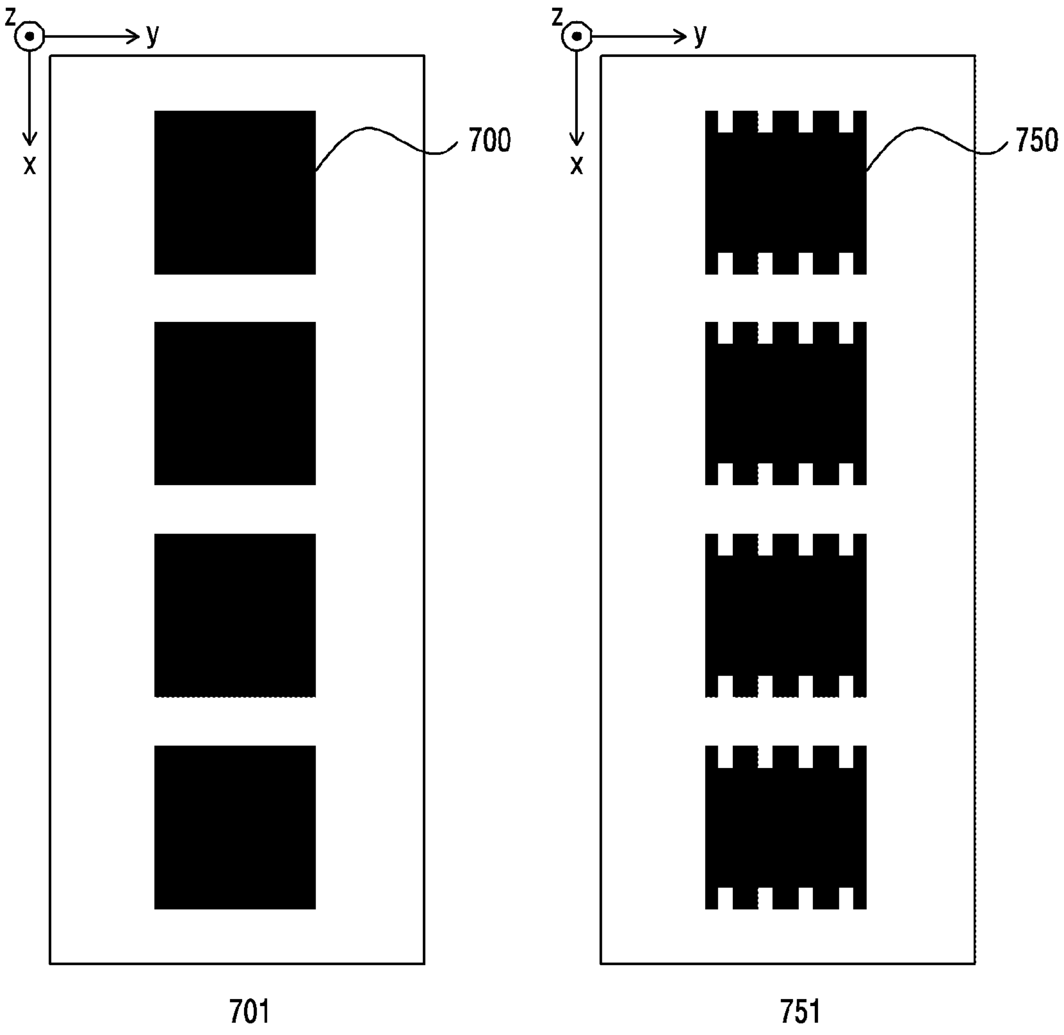
FIG. 7A is a diagram illustrating an example of an asymmetry antenna element according to various embodiments.

FIG. 7A is a diagram illustrating another example of an asymmetry antenna element according to various embodiments.

To ease description, the present disclosure hereafter describes an antenna element which is a patch antenna by way of example. However, the present disclosure is not limited thereto, and the antenna element may be configured with various antennas. For example, the antenna element may be a stacked patch antenna. Alternatively, the antenna element may be an L-probe feeding antenna.

A sub array 701 of FIG. 7A may be understood in the same manner as the sub array 301 of FIG. 3B. For example, the sub array 701 may include antenna elements 700 which are patch antennas of a symmetry structure (e.g., a square). The antenna elements 700 included in the sub array 701 may be arrayed narrower than a specific interval. Herein, the specific interval may be a half of a wavelength λ of a signal radiated by the sub array 701.

According to an embodiment, a sub array 751 may include antenna elements 750 of an asymmetry structure. For example, the shape of the antenna elements 750 of the sub array 751 is a square structure, but may include at least one opening portion along a horizontal edge (e.g., a first edge) of the square.

The sub array 751 of FIG. 7A illustrates the structure including four opening portions along the first edge direction at one first edge, but the present disclosure is not limited thereto. For example, the antenna element 750 included in the sub array 751 may include one opening portion, two opening portions, three opening portions, or five opening portions at one first edge. The number of the opening portions included in the antenna element 750 may be determined based on a CPR value of the sub array 751. In other words, the number of the opening portions may be determined, by considering the CPR value satisfying a desired threshold value.

According to an embodiment, by considering the CPR value satisfying the desired threshold value, a size of the opening portion of each antenna element 750 may be determined. For example, a width of the opening portion in the first edge direction may be determined based on the CPR value. In addition, a width of the opening portion in the second edge direction may be determined based on the CPR value.

According to an embodiment, by considering the CPR value satisfying the desired threshold value, an interval between the opening portions of each antenna element 750 may be determined. For example, the interval between the opening portions may be formed narrow based on the CPR value. In addition, a wide interval between the opening portions may be formed based on the CPR value.

As mentioned above, the shape, the size, the interval, and the number of the opening portions of the antenna elements 750 included in the sub array 751 according to embodiments of the present disclosure may be determined individually, but the present disclosure is not limited thereto. In other words, the present disclosure may determine the opening portion to achieve the desired CPR value by changing the shape and the size of the opening portion, and the antenna elements each may include the determined opening. In addition, the present disclosure may determine the opening portion to achieve the desired CPR value by changing the shape and the interval of the opening portion, and the antenna elements each may include the determined opening.

According to an embodiment, the interval of the antenna elements 750 included in the sub array 751 may be disposed narrower than a specific interval. Herein, the specific interval may be the half of the wavelength λ of the signal radiated by the sub array 751.

According to an embodiment, the opening portion included in the antenna element 750 of the sub array 751 may be configured in various shapes. For example, as depicted, the opening portion may be configured in a quadrangle shape. The quadrangle may include a square, a rectangle and so on. In addition, the opening portion may be configured in a triangle shape. In addition, the opening portion may be configured in a circular shape.

FIG. 7A illustrates that the opening portion is included at the first edge corresponding to the horizontal direction of the antenna element of the sub array 751, but the present disclosure is not limited thereto. For example, the opening portion may be included at the second edge corresponding to the vertical direction of the antenna element of the sub array 751. In addition, both the first edge corresponding to the horizontal direction and the second edge corresponding to the vertical direction of the antenna element of the sub array 751 may include the opening portion.

Figure 7B:
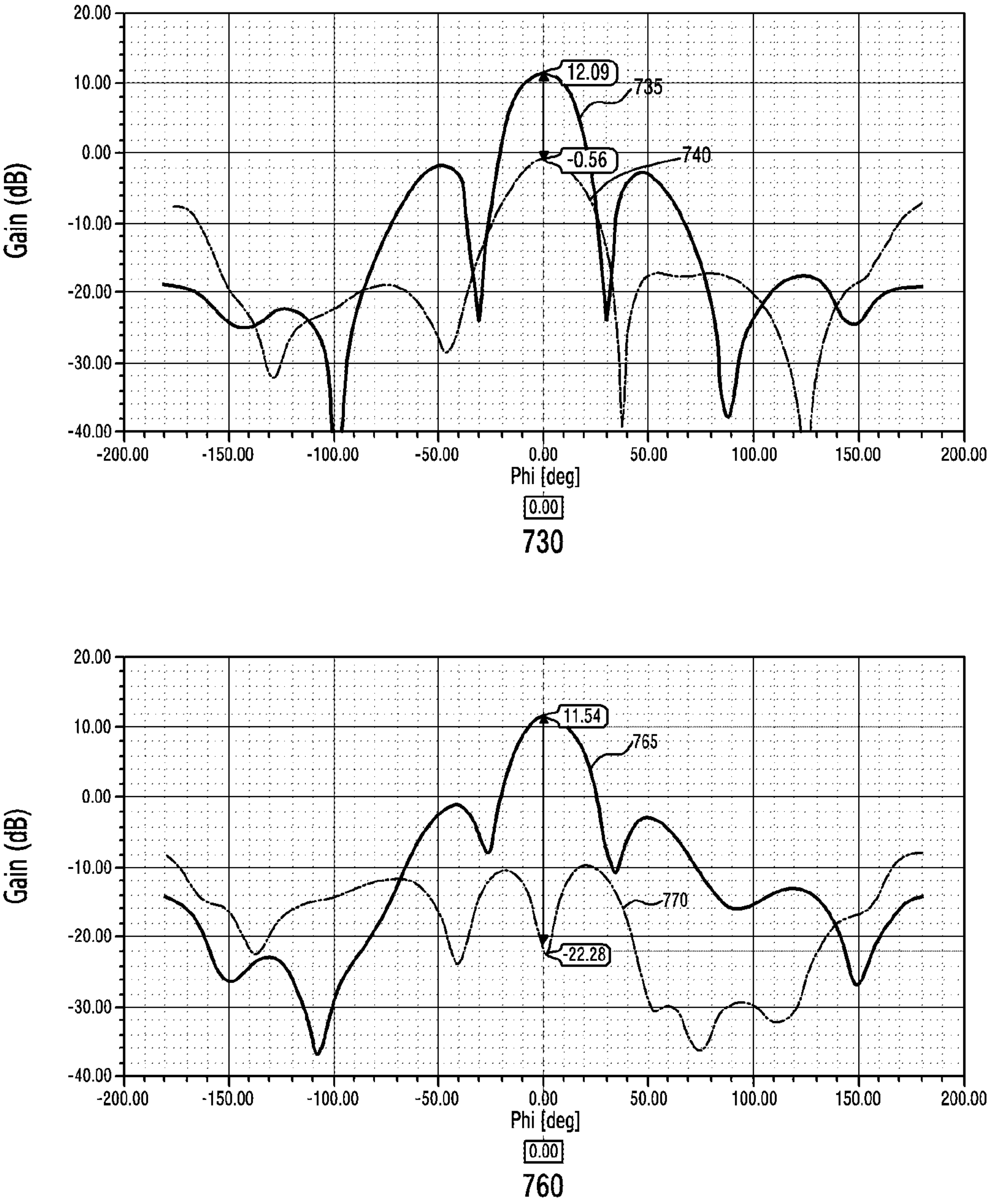
FIG. 7B includes graphs illustrating examples of a CPR of a structure including a plurality of asymmetry antenna elements according to various embodiments.

FIG. 7B includes graphs illustrating examples of a CPR of a structure including a plurality of asymmetry antenna elements according to various embodiments.

The CPR may indicate the level difference between the co-pol and the cross-pol in a specific direction. A horizontal axis of a graph 730 and a graph 760 indicates the angle (or the angle on the azimuth plane) (unit: degree, °) based on the z axis on the xy plane, and a vertical axis indicates the gain (unit: dB). The cross-pol component gain may be defined as the decibel difference between the maximum radiation intensities of the cross-pol component and the co-pol component.

According to an embodiment, the graph 730 shows the CPR of the sub array 701 including the symmetry antenna elements. Herein, the symmetry antenna element may be a patch antenna having a square shape. For example, the antenna element may be 1:1 (a is a different value from b) in the ratio between the length of the horizontal edge (e.g., a first edge) and the length of the vertical edge (e.g., a second edge) in the square shape. Herein, the length of the edge may include either the physical length or the electrical length. The graph 760 shows the CPR of the sub array 751 including the asymmetry antenna elements. Herein, the asymmetry antenna element may be a patch antenna including a square shape or an opening portion.

According to an embodiment, the graph 760 shows a first line 735 indicating the co-pol gain of the sub array 701 based on the reference direction (e.g., +z direction out of the page) angle and a second line 740 indicating the cross-pol gain based on the reference direction angle. Referring to the graph 730, at 0° which is the reference direction (z-axis direction), the gain of the first line 735 may be about 12.09 dB, and the gain of the second line 740 may be about −0.56 dB. The CPR at 0° may be about 12.65 dB. The graph 760 shows a third line 765 indicating the co-pol gain of the sub array 751 based on the reference direction (e.g., +z direction out of the page) angle and a fourth line 770 indicating the cross-pol gain based on the reference direction angle. Referring to the graph 760, at 0° which is the reference direction (z-axis direction), the gain of the third line 765 may be about 11.54 dB, and the gain of the fourth line 770 may be about −22.28 dB. The CPR at 0° may be about 33.82 dB.

As described above, the sub array 701 in which the antenna element structure is the symmetry structure may form the low electrical vector component differently from 45° according to the array of the plurality of the antenna elements, and thus the sub array may have the low CPR value. Since mutual coupling of the antenna elements applies, the sub array 701 may be degraded in the radiation performance. However, the sub array 751 in which the antenna element structure is the asymmetry structure may improve the CPR value of the sub array 751, even if the plurality of the antenna elements is arrayed narrower than the specific interval. Hence, the polarization purity of the sub array 701 may be higher than the polarization purity of the sub array 751. As a result, in the sub array of the plurality of the antenna elements, the CPR value may increase, due to the antenna elements of the asymmetry structure even if the interval between the antenna elements is narrower than the specific interval, the throughput of the sub array may increase, and the radiation performance of the sub array may be improved. While the sub array is illustrated by way of non-limiting example to ease the explanation, the above details may be applied also to an array antenna including a plurality of sub arrays, an antenna, or an electronic device including the antenna of such a structure in the same manner.

Referring to FIG. 1A through FIG. 7B, the antenna including the asymmetry antenna elements and the electronic device including the same according to embodiments of the present disclosure may minimize and/or reduce tolerance in the manufacturing process, and mount a greater number of antenna elements. In addition, the antenna including the asymmetry antenna elements and the electronic device may reduce the manufacturing cost compared to a conventional antenna structure, and improve the radiation performance of the antenna or the electronic device.

For example, the antenna including the asymmetry antenna elements and the electronic device including the same according to various embodiments of the present disclosure may be produced with an efficient cost, by the structure including the antenna elements of the relatively simple structure, compared to antenna elements including slots of a complex structure on a surface of a patch antenna. In addition, the manufacturing process of the antenna including the asymmetry antenna elements and the electronic device including the same according to embodiments of the present disclosure may be simplified to minimize and/or reduce the tolerance compared to the manufacturing process of the structure including the antenna elements of the complicated structure. Also, the antenna including the asymmetry antenna elements and the electronic device including the same according to embodiments of the present disclosure may minimize and/or reduce the tolerance according to the relatively simple manufacturing process and reduce the manufacturing cost, and improve the radiation performance. As another example, the antenna including the asymmetry antenna elements and the electronic device including the same according to embodiments of the present disclosure may minimize and/or reduce the tolerance according to the relatively simple manufacturing process, reduce the manufacturing cost, and improve the radiation performance, compared to an antenna structure including a reflector in a region adjacent to antenna elements. For example, the array antenna including the asymmetry antenna elements according to embodiments of the present disclosure may be higher in the CPR value of the reference direction by about 10 dB than an array antenna including a plurality of antenna elements.

While FIG. 1A through FIG. 7B have described the sub array including the asymmetry antenna elements according to various embodiments of the present disclosure, an array antenna or an antenna including a greater number of antenna elements may be also understood as an embodiment of the present disclosure. In an addition, an MMU or an mmWave device which configures one equipment by coupling a plurality of additional components such as a plurality of antenna elements, an RF component (e.g., a filter, etc.) and a mother board may be also understood as an embodiment of the present disclosure. Hereafter, an example in which the antenna including the asymmetry antenna elements and the antenna structure including the same are mounted and implemented in the electronic device according to embodiments of the present disclosure is described in FIG. 8.

Figure 8:
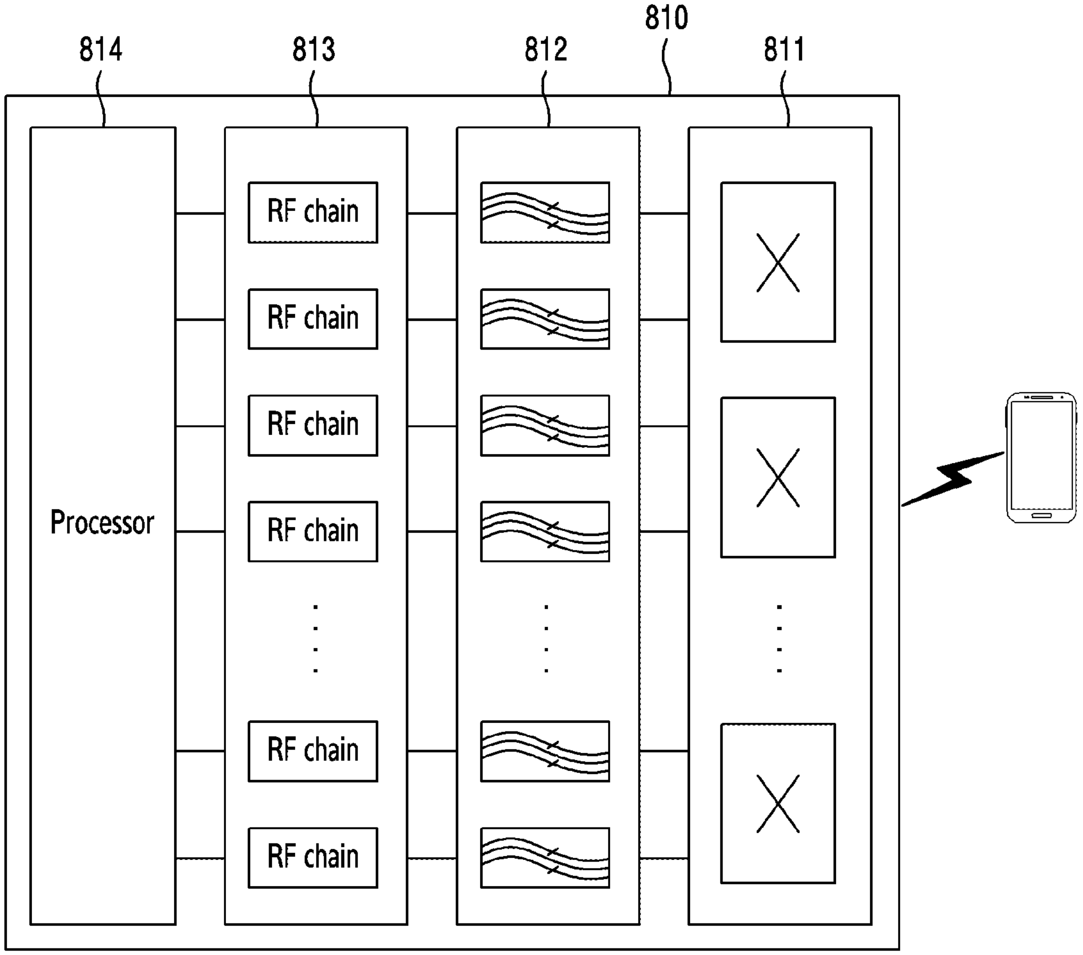
FIG. 8 is a diagram illustrating an example configuration of an electronic device according to various embodiments.

FIG. 8 is a diagram illustrating an example configuration of an electronic device according to various embodiments. An electronic device 810 may be one of a base station or a terminal. According to an embodiment, the electronic device 810 may be an MMU or mmWave device. Not only the structure including the asymmetry antenna elements mentioned in FIG. 1A through FIG. 7B, but also the antenna including the same and the electronic device including the same are included in embodiments of the present disclosure.

Referring to FIG. 8, an example functional configuration of the electronic device 810 is illustrated. The electronic device 810 may include an antenna unit (e.g., including at least one antenna) 811, a filter unit (e.g., including a filter) 812, an RF processing unit (e.g., including various circuitry) 813, and a control unit (e.g., including processing circuitry) 814.

The antenna unit 811 may include a plurality of antennas. The antenna performs functions for transmitting and receiving signals over a radio channel. The antenna may include a conductor formed on a substrate (e.g., an antenna PCB, an antenna board) or a radiator formed in a conductive pattern. The antenna may radiate an upconverted signal or obtain a signal radiated by other device over the radio channel. Each antenna may be referred to as an antenna element or an antenna element. In various embodiments, the antenna unit 811 may include an antenna array (e.g., a sub array) in which a plurality of antenna elements is arrayed. The antenna unit 811 may be electrically connected with the filter unit 812 through RF signal lines. The antenna unit 811 may be mounted on a PCB including a plurality of antenna elements. The PCB may include the plurality of the RF signal lines interconnecting each antenna element with a filter of the filter unit 812. Such RF signal lines may be referred to as a feeding network. The antenna unit 811 may provide a received signal to the filter unit 812 or radiate a signal provided from the filter unit 812 over the air.

The antenna unit 811 according to various embodiments may include at least one antenna module having a dual polarized antenna. The dual polarized antenna may be, for example, a cross-pole (x-pol) antenna. The dual polarized antenna may include two antenna elements corresponding to different polarizations. For example, the dual polarized antenna may include a first antenna element having the polarization of +45° and a second antenna element having the polarization of −45°. It is noted that the polarizations may be formed with other orthogonal polarizations than +45° and −45°. Each antenna element may be connected with a feeding line, and may be electrically connected with the filter unit 812, the RF processing unit 813, and the control unit 814 to be described.

According to an embodiment, the dual polarized antenna may be a patch antenna (or a microstrip antenna). The dual polarized antenna, which has the patch antenna form, may be easily implemented and integrated as the array antenna. Two signals having different polarizations may be inputted to respective antenna ports. Each antenna port corresponds to the antenna element. For high efficiency, it is required to optimize the relationship of co-pol characteristics and cross-pol characteristics between the two signals having the different polarizations. In the dual polarized antenna, the co-pol characteristics indicate characteristics of a specific polarization component and the cross-pol characteristics indicate characteristics of other polarization component than the specific polarization component. The structure including asymmetry antenna elements according to embodiments of the present disclosure may be included in the antenna unit 811 of FIG. 8.

The filter unit 812 may include various filtering circuitry and perform filtering, to forward a signal of an intended frequency. The filter unit 812 may perform a function for selectively identifying a frequency by generating resonance. In various embodiments, the filter unit 812 may generate the resonance through a cavity structurally including a dielectric. Also, the filter unit 812 may generate the resonance through elements which generate inductance or capacitance in various embodiments. In addition, in various embodiments, the filter unit 812 may include an elastic filter such as a bulk acoustic wave (BAW) filter or a surface acoustic wave (SAW) filter. The filter unit 812 may include at least one of a band pass filter, a low pass filter, a high pass filter, or a band reject filter. That is, the filter unit 812 may include RF circuits for acquiring the signal of the frequency band for transmission or the frequency band for reception. The filter unit 812 according to various embodiments may electrically connect the antenna unit 811 and the RF processing unit 813.

The RF processing unit 813 may include various circuitry and a plurality of RF paths. The RF path may be a unit of a path through which the signal received via the antenna or the signal radiated through the antenna passes. At least one RF path may be referred to as an RF chain. The RF chain may include a plurality of RF elements (e.g., RF circuitry). The RF elements may include an amplifier, a mixer, an oscillator, a DAC, an ADC, or the like. For example, the RF processing unit 813 may include an up converter which upconverts a digital transmit signal of a base band into a transmission frequency, and a DAC which converts the upconverted digital transmit signal into an analog RF transmit signal. The up converter and the DAC form a part of the transmission path. The transmission path may further include a power amplifier (PA) or a coupler (or a combiner). In addition, for example, the RF processing unit 813 may include an ADC which converts an analog RF receive signal into a digital receive signal, and a down converter which converts the digital receive signal into the digital receive signal of the base band. The ADC and the down converter form a part of the reception path. The reception path may further include a low-noise amplifier (LNA) or a coupler (or a divider). RF parts of the RF processing unit may be implemented on the PCB. The electronic device 810 may include a structure in which the antenna unit 811—the filter unit 812—the RF processing unit 813 are stacked in order. The antennas and the RF parts of the RF processing unit may be implemented on the PCB, and filters may be repeatedly coupled between the PCB and the PCB to form a plurality of layers.

The control unit 814 may include various processing circuitry and control general operations of the electronic device 810. The control unit 814 may include various modules for performing communication. The control unit 814 may include at least one processor such as a modem. The control unit 814 may include modules for digital signal processing. For example, the control unit 814 may include a modem. In data transmission, the control unit 814 generates complex symbols by encoding and modulating a transmit bit string. In addition, for example, in data reception, the control unit 814 may restore a receive bit string by demodulating and decoding a base band signal. The control unit 814 may perform functions of a protocol stack required by the communication standard.

FIG. 8 has described the functional configuration of the electronic device 810, as the equipment for utilizing the structure including the asymmetry antenna elements of the present disclosure. However, the example shown in FIG. 8 is merely an example configuration for utilizing the structure including the asymmetry antenna elements and the antenna including the same, and the electronic device according to embodiments of the present disclosure described in FIG. 1A through FIG. 7B, and the embodiments of the present disclosure are not limited to the components of the equipment shown in FIG. 8. Hence, a sub array, an array antenna, and an antenna including the asymmetry antenna elements, and communication equipment of other configuration including the same according to embodiments of the present disclosure may be also understood as an embodiment of the present disclosure.

According to an example embodiment of the present disclosure as set forth above, an antenna in a wireless communication system may include: a plurality of antenna elements including a first antenna element and a second antenna element, the first antenna element and the second antenna element may include patch antennas, the first antenna element and the second antenna element may be disposed at a narrower interval than a reference interval, and the patch antenna may have an asymmetry structure.

In an example embodiment, the patch antenna may have a rectangle shape including a first edge and a second edge orthogonal to the first edge, and a length of the first edge may be different from a length of the second edge.

In an example embodiment, a ratio of the length of the first edge and the length of the second edge may be determined based on a CPR of the antenna.

In an example embodiment, the ratio of the length of the first edge and the length of the second edge may be greater than or equal to 0.8 and less than or equal to 1.2.

In an example embodiment, the patch antenna may have a square shape including a first edge and a second edge orthogonal to the first edge, and the first edge may include at least one opening portion along a longitudinal direction of the first edge.

In an example embodiment, at least one of the number, a size, a shape of the at least one opening portion or an interval between opening portions may be determined based on a CPR of the antenna.

In an example embodiment, the at least one opening portion may have a quadrangle shape.

In an example embodiment, the reference interval may be a length corresponding to a half of a signal wavelength transmitted and/or received via the antenna.

In an example embodiment, the reference interval may be a distance from a center of the first antenna element to a center of the second antenna element.

In an example embodiment, the first antenna element and the second antenna element may be disposed within a specified distance to each other.

According to an example embodiment of the present disclosure as set forth above, an MMU device may include a main board, an RFIC disposed on the main board and a plurality of antenna elements disposed on the main board, the plurality of the antenna elements may include a first antenna element and a second antenna element, the first antenna element and the second antenna element may include patch antennas, the first antenna element and the second antenna element may be disposed at a narrower interval than a reference interval, and the patch antenna may have an asymmetry structure.

In an example embodiment, the patch antenna may have a rectangle shape including a first edge and a second edge orthogonal to the first edge, and a length of the first edge may be different from a length of the second edge.

In an example embodiment, a ratio of the length of the first edge and the length of the second edge may be determined based on a CPR of the antenna.

In an example embodiment, the ratio of the length of the first edge and the length of the second edge may be greater than or equal to 0.8 and less than or equal to 1.2.

In an example embodiment, the patch antenna may have a square shape including a first edge and a second edge orthogonal to the first edge, and the first edge may include at least one opening portion along a longitudinal direction of the first edge.

In an example embodiment, at least one of the number, a size, a shape of the at least one opening portion or an interval between opening portions may be determined based on a CPR of the antenna.

In an example embodiment, the at least one opening portion may have a quadrangle shape.

In an example embodiment, the reference interval may be a length corresponding to a half of a signal wavelength transmitted and/or received via the antenna.

In an example embodiment, the reference interval may be a distance from a center of the first antenna element to a center of the second antenna element.

In an example embodiment, the first antenna element and the second antenna element may be disposed close to each other.

Methods according to various embodiments described in the claims or the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to various embodiments described in the claims or the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. The program may be stored to a memory combining part or all of those recording media. In addition, a plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the various embodiments of the present disclosure, the elements included in the present disclosure are expressed in a singular or plural form. However, the singular or plural expression is appropriately selected according to a situation for the convenience of explanation, the present disclosure is not limited to a single element or a plurality of elements, the elements expressed in the plural form may be configured as a single element, and the elements expressed in the singular form may be configured as a plurality of elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An antenna device in a wireless communication system, the antenna device comprising:

a substrate;

a plurality of antenna elements disposed on the substrate, and comprising a first antenna element, a second antenna element, and a third antenna element, wherein each of the plurality of antenna elements has a rectangle shape and includes a first edge and a second edge longer than the first edge such that a vector component of a current flowing through each of the plurality of antenna elements is not oriented at 45 degrees to the second edge; and at least one feeding line for the first antenna element, the second antenna element, and the third antenna element, wherein a distance between a center of the first antenna element and a center of the second antenna element is shorter than a length corresponding to a half of a wavelength of polarized signals transmitted and/or received via the plurality of antenna elements, such that a first mutual coupling between the first antenna element and the second antenna element is formed, wherein a distance between the center of the second antenna element and a center of the third antenna element is shorter than the length, such that a second mutual coupling between the second antenna element and the third antenna element is formed, and wherein a sum of vector components of currents flowing through the plurality of antenna elements and corresponding to the polarized signals is oriented at 45 degrees to the second edge by the first mutual coupling between the first antenna element and the second antenna element, and the second mutual coupling between the second antenna element and the third antenna element.

2. The antenna device of claim 1, wherein the first edge is orthogonal to the second edge, and wherein a ratio of a length of the first edge to a length of the second edge is determined based on a cross polarization ratio (CPR) of the plurality of antenna elements.

3. The antenna device of claim 1, wherein the first edge includes at least one opening portion along a longitudinal direction of the first edge.

4. The antenna device of claim 3, wherein at least one of a number of the at least one opening portion, a size of the at least one opening portion, or a shape of the at least one opening portion is determined based on a cross polarization ratio (CPR) of the plurality of antenna elements.

5. The antenna device of claim 4, wherein the at least one opening portion is quadrangular.

6. The antenna device of claim 1, wherein the first antenna element including an edge corresponding to the first edge and the second antenna element including an edge corresponding to the first edge are disposed such that the edge of the first antenna element faces the edge of the second antenna element.

7. A massive multiple input multiple output (MIMO) unit (MMU) device, the MMU device comprising:

a substrate;

a radio frequency integrated circuit (RFIC) disposed on the substrate;

a plurality of antenna elements disposed on the substrate and comprising a first antenna element, a second antenna element, and a third antenna element, wherein each of the plurality of antenna elements has a rectangle shape and includes a first edge and a second edge longer than the first edge such that a vector component of a current flowing through each of the plurality of antenna elements is not oriented at 45 degrees to the second edge; and at least one first feeding line electrically connected with the RFIC for the first antenna element, the second antenna element, and the third antenna element, wherein a distance between a center of the first antenna element and a center of the second antenna element is shorter than a length corresponding to a half of a wavelength of polarized signals transmitted and/or received via the plurality of antenna elements, such that a first mutual coupling between the first antenna element and the second antenna element is formed, wherein a distance between the center of the second antenna element and a center of the third antenna element is shorter than the length, such that a second mutual coupling between the second antenna element and the third antenna element is formed, and wherein a sum of vector components of currents flowing through the plurality of antenna elements and corresponding to the polarized signals is oriented at 45 degrees to the second edge by the first mutual coupling between the first antenna element and the second antenna element, and the second mutual coupling between the second antenna element and the third antenna element.

8. The MMU device of claim 7, wherein the first edge is orthogonal to the second edge, and wherein a ratio of a length of the first edge to a length of the second edge is determined based on a cross polarization ratio (CPR) of the plurality of antenna elements.

9. The MMU device of claim 7, wherein the first edge include at least one opening portion along a longitudinal direction of the first edge.

10. The MMU device of claim 9, wherein at least one of a number of the at least one opening portion, a size of the at least one opening portion, or a shape of the at least one opening portion is determined based on a cross polarization ratio (CPR) of the plurality of antenna elements.

11. The MMU device of claim 10, wherein the at least one opening portion is quadrangular.

12. The MMU device of claim 7, wherein the first antenna element including an edge corresponding to the first edge and the second antenna element including an edge corresponding to the first edge are disposed such that the edge of the first antenna element faces the edge of the second antenna element.

* * * * *